(12) United States Patent
Shigemitsu et al.

(10) Patent No.: US 8,373,936 B2
(45) Date of Patent: Feb. 12, 2013

(54) IMAGE SENSING LENS AND IMAGE SENSING MODULE

(75) Inventors: Norimichi Shigemitsu, Osaka (JP); Hiroyuki Hanato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 78 days.

(21) Appl. No.: 13/053,943

(22) Filed: Mar. 22, 2011

(65) Prior Publication Data

US 2011/0249171 A1 Oct. 13, 2011

(30) Foreign Application Priority Data

Apr. 12, 2010 (JP) ................................. 2010-091664

(51) Int. Cl.
*G02B 3/02* (2006.01)
*G02B 9/34* (2006.01)
*H04N 5/225* (2006.01)

(52) U.S. Cl. .......................... 359/715; 359/773; 348/340

(58) Field of Classification Search .................. 348/335, 348/340; 359/715, 772, 773
See application file for complete search history.

(56) References Cited

U.S. PATENT DOCUMENTS

| 5,418,356 | A | 5/1995 | Takano |
| 5,739,965 | A | 4/1998 | Ohno |
| 6,122,009 | A | 9/2000 | Ueda |
| 6,744,570 | B1 | 6/2004 | Isono |
| 7,436,604 | B1 | 10/2008 | Tang |
| RE40,638 | E | 2/2009 | Saito |
| 7,688,523 | B2 | 3/2010 | Sano |
| 7,755,854 | B2 | 7/2010 | Sano |
| 7,764,442 | B2 | 7/2010 | Teraoka |
| 7,852,573 | B2 | 12/2010 | Teraoka et al. |
| 7,957,076 | B2 | 6/2011 | Tang |
| 2001/0003494 | A1 | 6/2001 | Kitagawa |
| 2003/0048549 | A1 | 3/2003 | Sato |
| 2003/0063396 | A1 | 4/2003 | Saito |
| 2003/0184883 | A1 | 10/2003 | Sato et al. |
| 2003/0197956 | A1 | 10/2003 | Yamakawa |
| 2004/0047274 | A1 | 3/2004 | Amanai |
| 2004/0105173 | A1 | 6/2004 | Yamaguchi |
| 2004/0160680 | A1 | 8/2004 | Shinohara |
| 2004/0189854 | A1 | 9/2004 | Tsukamoto |

(Continued)

FOREIGN PATENT DOCUMENTS

| CN | 1892279 A | 1/2007 |
| CN | 2890966 Y | 4/2007 |

(Continued)

OTHER PUBLICATIONS

U.S. Appl. No. 13/432,566, filed Mar. 28, 2012, entitled "Lens Aligning Device and Image Capturing Lens".

(Continued)

*Primary Examiner* — David N Spector
(74) *Attorney, Agent, or Firm* — Nixon & Vanderhye P.C.

(57) ABSTRACT

To provide an image sensing lens and an image sensing module each of which includes four lenses and each of which corrects aberrations well and has a great resolving power and a reduced height, an image sensing lens includes (i) a third lens which has a surface facing an image surface, the surface being an aspheric surface and (ii) a fourth lens which has a surface facing an object and a surface facing the image surface, the surfaces being each an aspheric surface. The image sensing lens satisfies the following Formulae (1) through (3):

$$0.51 < f1/f < 0.78 \qquad (1)$$

$$-1.63 < f2/f < -0.97 \qquad (2)$$

$$v1 - v2 > 20 \qquad (3).$$

8 Claims, 25 Drawing Sheets

U.S. PATENT DOCUMENTS

| | | |
|---|---|---|
| 2004/0228009 A1 | 11/2004 | Kama |
| 2005/0002117 A1 | 1/2005 | Ninomiya et al. |
| 2005/0041306 A1 | 2/2005 | Matsuo |
| 2005/0068640 A1 | 3/2005 | Sato |
| 2005/0073753 A1 | 4/2005 | Sato |
| 2005/0073754 A1 | 4/2005 | Sato |
| 2005/0105194 A1 | 5/2005 | Matsui |
| 2005/0128597 A1 | 6/2005 | Amanai |
| 2006/0209429 A1 | 9/2006 | Sato et al. |
| 2006/0238898 A1 | 10/2006 | Shinohara |
| 2007/0008625 A1 | 1/2007 | Park et al. |
| 2007/0010122 A1 | 1/2007 | Wang |
| 2007/0070518 A1 | 3/2007 | Muratani et al. |
| 2007/0127141 A1 | 6/2007 | Saito |
| 2007/0127142 A1 | 6/2007 | Saito |
| 2007/0133108 A1 | 6/2007 | Saito |
| 2008/0043346 A1 | 2/2008 | Sano |
| 2008/0180816 A1 | 7/2008 | Nakamura |
| 2008/0239138 A1 | 10/2008 | Sano |
| 2009/0009889 A1 | 1/2009 | Teraoka |
| 2009/0015944 A1 | 1/2009 | Taniyama |
| 2009/0059392 A1 | 3/2009 | Sano |
| 2009/0086017 A1 | 4/2009 | Miyano |
| 2009/0257133 A1 | 10/2009 | Sano |
| 2009/0290234 A1 | 11/2009 | Sano |
| 2010/0046096 A1 | 2/2010 | Hirao et al. |
| 2010/0091387 A1 | 4/2010 | Hirao et al. |
| 2010/0097711 A1 | 4/2010 | Saito |
| 2010/0103533 A1 | 4/2010 | Taniyama |
| 2010/0134903 A1 | 6/2010 | Hirao et al. |
| 2010/0134905 A1 | 6/2010 | Hirao et al. |
| 2010/0166413 A1 | 7/2010 | Hirao et al. |
| 2010/0181691 A1 | 7/2010 | Yoshida |
| 2010/0188555 A1 | 7/2010 | Hirao et al. |
| 2010/0321794 A1 | 12/2010 | Hirao et al. |
| 2011/0001865 A1 | 1/2011 | Hirao et al. |
| 2011/0007195 A1 | 1/2011 | Fukutu |
| 2011/0032410 A1 | 2/2011 | Shigemitsu et al. |
| 2011/0061799 A1 | 3/2011 | Wang |
| 2011/0205641 A1 | 8/2011 | Shih |
| 2011/0255177 A1 | 10/2011 | Suzuki et al. |
| 2011/0267709 A1 | 11/2011 | Hirao et al. |
| 2011/0310495 A1 * | 12/2011 | You ............................. 359/773 |

FOREIGN PATENT DOCUMENTS

| | | |
|---|---|---|
| CN | 101266329 A | 9/2008 |
| CN | 201273959 Y | 7/2009 |
| JP | 59-022009 | 2/1984 |
| JP | 59-022009 A | 2/1984 |
| JP | 61-057918 | 3/1986 |
| JP | 61-057918 A | 3/1986 |
| JP | 04-191716 | 7/1992 |
| JP | 7-5358 | 1/1995 |
| JP | 08-334684 | 12/1996 |
| JP | 9-284617 | 10/1997 |
| JP | 10-104491 | 4/1998 |
| JP | 10-170809 | 6/1998 |
| JP | 2001-221904 | 8/2001 |
| JP | 2002-098885 | 4/2002 |
| JP | 2002-296496 | 10/2002 |
| JP | 2003-029115 | 1/2003 |
| JP | 2003-057538 | 2/2003 |
| JP | 2003-270526 A | 9/2003 |
| JP | 2003-329922 A | 11/2003 |
| JP | 2004-004620 | 1/2004 |
| JP | 2004-064460 | 2/2004 |
| JP | 2004-88713 A | 3/2004 |
| JP | 2004-145183 | 5/2004 |
| JP | 2004-226487 A | 8/2004 |
| JP | 2004-246168 | 9/2004 |
| JP | 2004-246169 | 9/2004 |
| JP | 2004-252067 | 9/2004 |
| JP | 2004-254259 | 9/2004 |
| JP | 2004-301938 | 10/2004 |
| JP | 2005-018306 | 1/2005 |
| JP | 2005-24581 | 1/2005 |
| JP | 2005-24889 | 1/2005 |
| JP | 2005-107254 | 4/2005 |
| JP | 2005-107368 | 4/2005 |
| JP | 2005-107369 | 4/2005 |
| JP | 2005-157154 A | 6/2005 |
| JP | 2005-286536 | 10/2005 |
| JP | 2006-178026 | 7/2006 |
| JP | 2006-293324 A | 10/2006 |
| JP | 2006-317916 | 11/2006 |
| JP | 2007-065374 | 3/2007 |
| JP | 2007-93972 | 4/2007 |
| JP | 2007-155821 A | 6/2007 |
| JP | 2007-156030 A | 6/2007 |
| JP | 2007-156031 A | 6/2007 |
| JP | 2007-212878 A | 8/2007 |
| JP | 2007-293176 A | 11/2007 |
| JP | 2008-33376 | 2/2008 |
| JP | 2008-46526 | 2/2008 |
| JP | 2008-76594 A | 4/2008 |
| JP | 2008-107616 | 5/2008 |
| JP | 2008-185880 A | 8/2008 |
| JP | 2008-242180 | 10/2008 |
| JP | 2008-281873 | 11/2008 |
| JP | 2008-309999 | 12/2008 |
| JP | 2009-14899 | 1/2009 |
| JP | 2009-018578 | 1/2009 |
| JP | 2009-20182 A | 1/2009 |
| JP | 2009-023353 | 2/2009 |
| JP | 2009-47836 A | 3/2009 |
| JP | 2009-53592 | 3/2009 |
| JP | 2009-80413 A | 4/2009 |
| JP | 2009-098492 | 5/2009 |
| JP | 2009-151113 A | 7/2009 |
| JP | 2009-157402 A | 7/2009 |
| JP | 2009-251515 | 10/2009 |
| JP | 2009-251516 | 10/2009 |
| JP | 2009-258286 | 11/2009 |
| JP | 2009-282223 | 12/2009 |
| JP | 2010-72032 A | 4/2010 |
| JP | 2010-101942 | 5/2010 |
| JP | 2010-102162 A | 5/2010 |
| JP | 2010-151935 | 7/2010 |
| JP | 2011-107631 A | 6/2011 |
| TW | 200703636 A | 1/2007 |
| WO | 2009/025275 A1 | 2/2009 |
| WO | 2009/116492 A1 | 9/2009 |

OTHER PUBLICATIONS

Office Action mailed Apr. 26, 2012 in U.S. Appl. No. 12/833,313.
U.S. Appl. No. 13/159,755, filed Jun. 14, 2011, entitled Lens Element, Imaging Lens, and Imaging Module.
U.S. Appl. No. 12/833,313, Shigemitsu et al., filed Jul. 9, 2010.
U.S. Appl. No. 12/849,257, Shigemitsu et al., filed Aug. 3, 2010.
U.S. Appl. No. 12/899,763, Shigemitsu et al., filed Oct. 7, 2010.
U.S. Appl. No. 12/887,639, Shigemitsu et al., filed Sep. 22, 2010.
U.S. Appl. No. 13/005,877, Shigemitsu et al., filed Jan. 13, 2011.
Office Action mailed Sep. 7, 2012 in U.S. Appl. No. 12/833,313.

* cited by examiner

FIG. 1
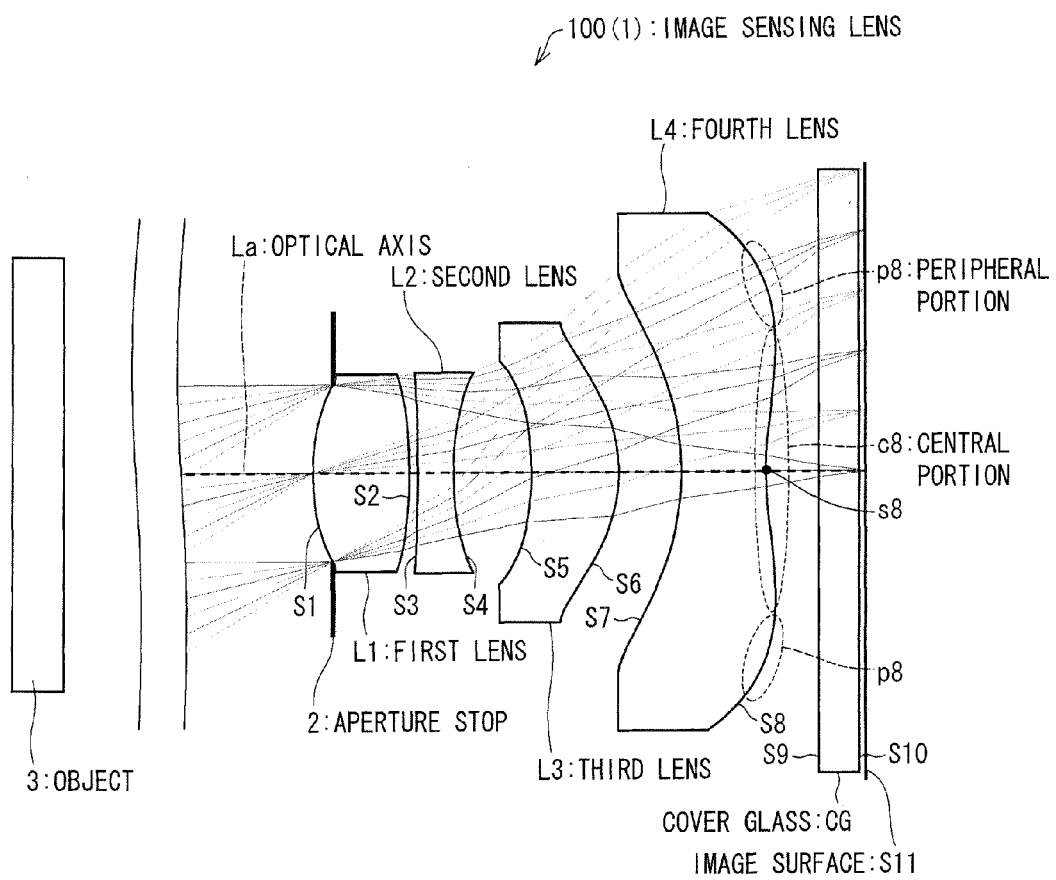
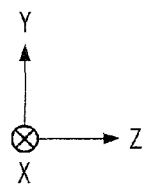

FIG. 2
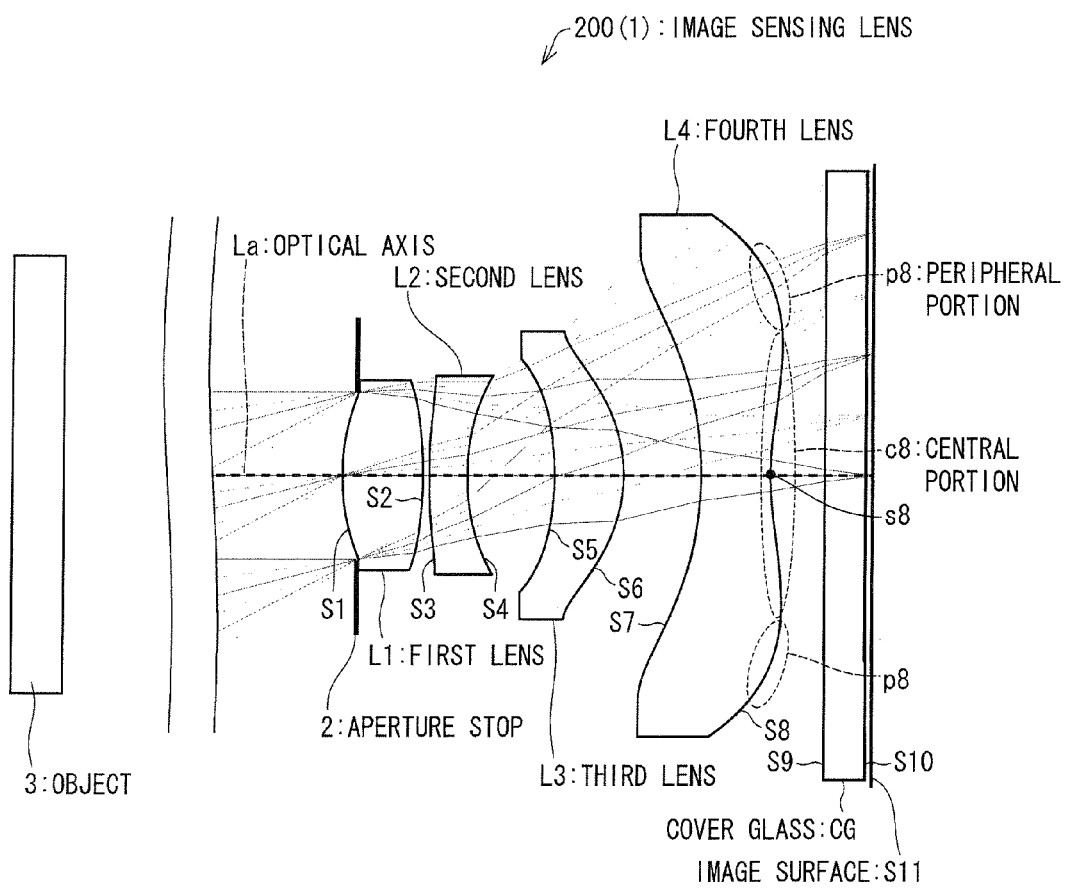
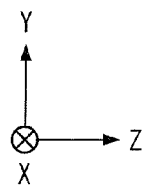

FIG. 3
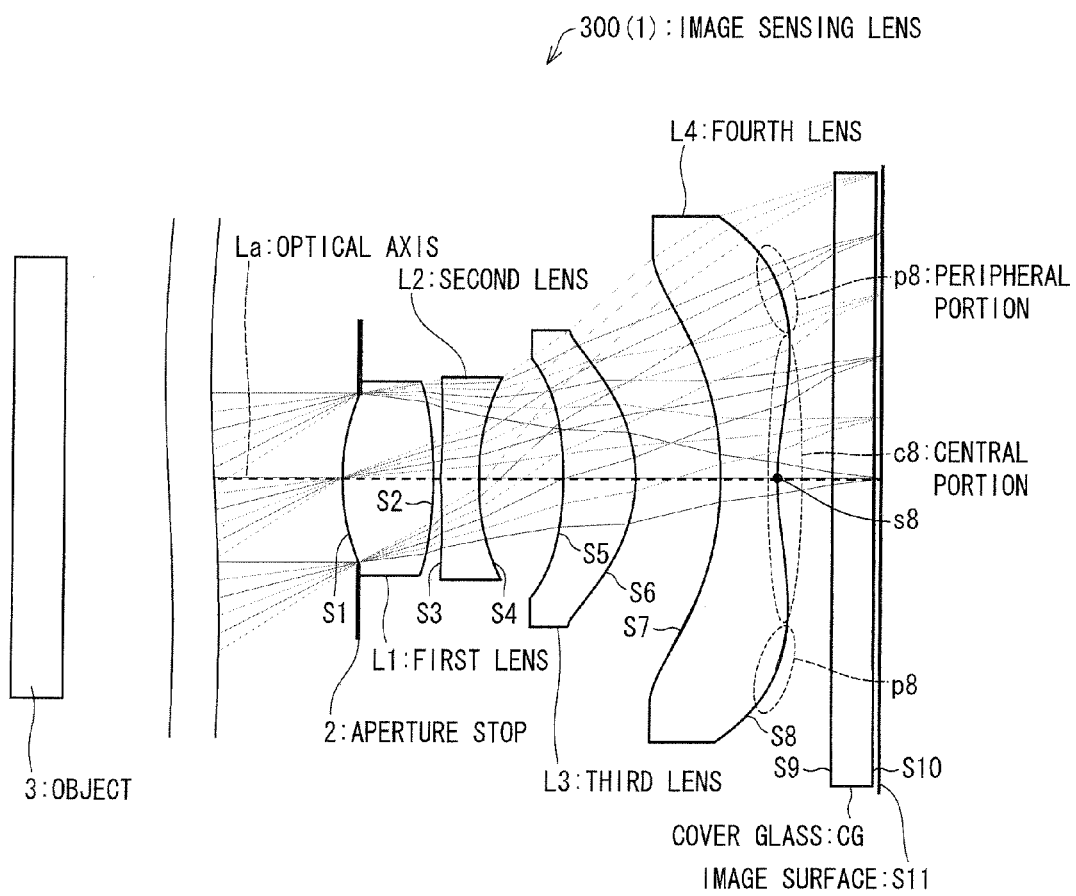
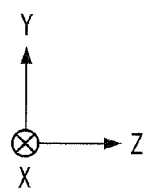

FIG. 33

| Element | Material | | Surface | Curvature [mm⁻¹] | Center thickness [mm] | Effective radius [mm] | Conic coefficient | Aspheric coefficient | | | | | | |
|---|---|---|---|---|---|---|---|---|---|---|---|---|---|---|
| | Nd | νd | | | | | | A4 | A6 | A8 | A10 | A12 | A14 | A16 |
| L1 | 1.531 | 56 | S1 | 7.178404999E-01 | 0.720 | 0.663 | 0.00E+00 | -2.244303012E-02 | 2.024626240E-01 | -3.23733473E+00 | 1.86201712E+01 | -5.50966141E+01 | 8.09509118E+01 | -4.73770826E+01 |
| | | | S2 | -9.976277480E-02 | 0.059 | 0.737 | 0.00E+00 | -2.437758460E-01 | 1.044764300E+00 | -7.77582292E+00 | 2.78604194E+01 | -5.22141619E+01 | 4.76734378E+01 | -1.59810934E+01 |
| L2 | 1.614 | 26 | S3 | 1.291248900E-01 | 0.279 | 0.741 | 0.00E+00 | -3.072121130E-01 | 1.985110580E+00 | -1.43721795E+01 | 5.45194830E+01 | -1.10930268E+02 | 1.15088751E+02 | -4.70759821E+01 |
| | | | S4 | 4.621851390E-01 | 0.587 | 0.755 | 0.00E+00 | -6.376317740E-02 | 6.849107840E-01 | -3.58576635E+00 | 1.01638095E+01 | -1.37060459E+01 | 6.86358644E+00 | 9.07669589E-01 |
| L3 | 1.531 | 56 | S5 | -4.123364240E-01 | 0.650 | 0.857 | 0.00E+00 | -1.188569770E-01 | -8.682335920E-02 | 4.39558474E-03 | -5.45410769E-05 | 0.00000000E+00 | 0.00000000E+00 | 0.00000000E+00 |
| | | | S6 | -7.780652880E-01 | 0.474 | 1.160 | 0.00E+00 | 2.052965200E-02 | 4.400511780E-02 | -9.61385924E-02 | 2.44694107E-01 | -2.50345889E-01 | 1.74474333E-01 | -4.93050458E-02 |
| L4 | 1.531 | 56 | S7 | -3.489298510E-01 | 0.620 | 1.637 | 0.00E+00 | -1.760080190E-01 | 1.346860200E-01 | -2.32470510E-02 | -8.79740085E-03 | 4.23463875E-03 | -3.63601918E-04 | -4.01739087E-05 |
| | | | S8 | 4.071474300E-01 | 0.394 | 2.023 | 0.00E+00 | -2.263455180E-01 | 1.212057360E-01 | -5.34703147E-02 | 1.43789890E-02 | -2.18508409E-03 | 1.36032730E-04 | 0.00000000E+00 |
| CG | 1.516 | 64 | S9 | 0.000000000E+00 | 0.300 | - | 0.00E+00 | 0.000000000E+00 | 0.000000000E+00 | 0.00000000E+00 | 0.00000000E+00 | 0.00000000E+00 | 0.00000000E+00 | 0.00000000E+00 |
| | | | S10 | 0.000000000E+00 | 0.050 | - | 0.00E+00 | 0.000000000E+00 | 0.000000000E+00 | 0.00000000E+00 | 0.00000000E+00 | 0.00000000E+00 | 0.00000000E+00 | 0.00000000E+00 |
| Sensor | - | - | S11 | 0.000000000E+00 | 0.000 | - | 0.00E+00 | 0.000000000E+00 | 0.000000000E+00 | 0.00000000E+00 | 0.00000000E+00 | 0.00000000E+00 | 0.00000000E+00 | 0.00000000E+00 |

FIG. 34

| Element | Material Nd | Material νd | Surface | Curvature [mm⁻¹] | Center thickness [mm] | Effective radius [mm] | Conic coefficient | Aspheric coefficient A4 | A6 | A8 | A10 | A12 | A14 | A16 |
|---|---|---|---|---|---|---|---|---|---|---|---|---|---|---|
| L1 | 1.531 | 56 | S1 | 6.67986236E-01 | 0.596 | 0.623 | 0.00E+00 | -3.955138895E-02 | 5.088298829E-03 | -2.174995465E+00 | 1.558619040E+01 | -5.496877399E+01 | 9.316265776E+01 | -6.228694955E+01 |
|  |  |  | S2 | -9.97922831E-02 | 0.059 | 0.712 | 0.00E+00 | -3.683606634E-01 | 1.345972460E+00 | -8.254684400E+00 | 2.852129500E+01 | -5.356453376E+01 | 4.880931200E+01 | -1.583384880E+01 |
| L2 | 1.614 | 26 | S3 | 3.40115175E-01 | 0.280 | 0.736 | 0.00E+00 | -4.129016890E-01 | 2.204288070E+00 | -1.418181940E+01 | 5.350461380E+01 | -1.108863320E+02 | 1.187418820E+02 | -5.081814590E+01 |
|  |  |  | S4 | 6.60890041E-01 | 0.647 | 0.746 | 0.00E+00 | -1.026148880E-01 | 6.008299720E-01 | -3.126265700E+00 | 9.328701180E+00 | -1.375699740E+01 | 8.706445720E+00 | -6.961831110E-01 |
| L3 | 1.531 | 56 | S5 | -4.45220544E-01 | 0.512 | 0.875 | 0.00E+00 | -1.083109790E-01 | -1.228133810E-01 | 7.734000700E-02 | -6.497318570E-05 | 0.000000000E+00 | 0.000000000E+00 | 0.000000000E+00 |
|  |  |  | S6 | -8.42461779E-01 | 0.571 | 1.110 | 0.00E+00 | 4.347310970E-02 | 2.209770220E-02 | -1.205159590E-01 | 3.122636550E-01 | -2.545303560E-01 | 1.629565300E-01 | -4.318008520E-02 |
| L4 | 1.531 | 56 | S7 | -2.54501355E-01 | 0.512 | 1.758 | 0.00E+00 | -1.738279160E-01 | 1.120031860E-01 | -8.933725510E-02 | -1.298820940E-02 | 4.511482020E-03 | -3.890455680E-04 | -1.571589350E-05 |
|  |  |  | S8 | 4.64449728E-01 | 0.395 | 2.029 | 0.00E+00 | -2.580617880E-01 | 1.365805210E-01 | -5.953395280E-02 | 1.518499440E-02 | -2.086947720E-03 | 1.037100680E-04 | 0.000000000E+00 |
| CG | 1.516 | 64 | S9 | 0.00000000E+00 | 0.300 | — | 0.00E+00 | 0.000000000E+00 | 0.000000000E+00 | 0.000000000E+00 | 0.000000000E+00 | 0.000000000E+00 | 0.000000000E+00 | 0.000000000E+00 |
|  |  |  | S10 | 0.00000000E+00 | 0.050 | — | 0.00E+00 | 0.000000000E+00 | 0.000000000E+00 | 0.000000000E+00 | 0.000000000E+00 | 0.000000000E+00 | 0.000000000E+00 | 0.000000000E+00 |
| Sensor | — | — | S11 | 0.00000000E+00 | 0.000 | — | 0.00E+00 | 0.000000000E+00 | 0.000000000E+00 | 0.000000000E+00 | 0.000000000E+00 | 0.000000000E+00 | 0.000000000E+00 | 0.000000000E+00 |

FIG. 35

| Element | Material | | Surface | Curvature [mm⁻¹] | Center thickness [mm] | Effective radius [mm] | Conic coefficient | Aspheric coefficient | | | | | | | |
|---|---|---|---|---|---|---|---|---|---|---|---|---|---|---|---|
| | Nd | νd | | | | | | A4 | A6 | A8 | A10 | A12 | A14 | A16 |
| L1 | 1.531 | 56 | S1 | 6.800644461E-01 | 0.674 | 0.623 | 0.00E+00 | -2.490324430E-02 | 2.442554405E-02 | -2.145843450E+00 | 1.558501070E+01 | -5.495174940E+01 | 9.333113720E+01 | -6.244375670E+01 |
| | | | S2 | -9.984228070E-02 | 0.059 | 0.716 | 0.00E+00 | -4.000191960E-01 | 1.324028770E+00 | -7.996878240E+00 | 2.836047300E+01 | -5.405598350E+01 | 4.926653950E+01 | -1.560225770E+01 |
| L2 | 1.614 | 26 | S3 | 2.678423330E-01 | 0.280 | 0.730 | 0.00E+00 | -4.940496420E-01 | 2.140168020E+00 | -1.381391380E+01 | 5.323291040E+01 | -1.112550450E+02 | 1.181128580E+02 | -4.921769950E+01 |
| | | | S4 | 6.277865740E-01 | 0.623 | 0.760 | 0.00E+00 | -1.318172410E-01 | 5.936983760E-01 | -2.991140810E+00 | 9.134509860E+00 | -1.385142310E+01 | 9.290248850E+00 | -1.367944370E+00 |
| L3 | 1.531 | 56 | S5 | -3.848520110E-01 | 0.524 | 0.904 | 0.00E+00 | -7.981012540E-02 | -1.099646490E-01 | 4.496639260E-02 | -1.275994160E-04 | 0.000000000E+00 | 0.000000000E+00 | 0.000000000E+00 |
| | | | S6 | -8.333737580E-01 | 0.625 | 1.128 | 0.00E+00 | 5.503342740E-02 | 1.113818960E-02 | -1.036735440E-01 | 2.719836970E-01 | -2.637997170E-01 | 1.755183780E-01 | -4.207734690E-02 |
| L4 | 1.531 | 56 | S7 | -2.671955760E-01 | 0.414 | 1.756 | 0.00E+00 | -1.943399290E-01 | 1.192974160E-01 | -8.778379950E-03 | -1.315039180E-02 | 4.464032510E-03 | -3.910564430E-04 | -1.180654310E-05 |
| | | | S8 | 4.759946730E-01 | 0.395 | 2.005 | 0.00E+00 | -2.656278410E-01 | 1.343575000E-01 | -5.776212710E-02 | 1.490663050E-02 | -2.120149180E-03 | 1.113831360E-04 | 0.000000000E+00 |
| CG | 1.516 | 64 | S9 | 0.000000000E+00 | 0.300 | — | 0.00E+00 | 0.000000000E+00 | 0.000000000E+00 | 0.000000000E+00 | 0.000000000E+00 | 0.000000000E+00 | 0.000000000E+00 | 0.000000000E+00 |
| | | | S10 | 0.000000000E+00 | 0.050 | — | 0.00E+00 | 0.000000000E+00 | 0.000000000E+00 | 0.000000000E+00 | 0.000000000E+00 | 0.000000000E+00 | 0.000000000E+00 | 0.000000000E+00 |
| Sensor | — | — | S11 | 0.000000000E+00 | 0.000 | — | 0.00E+00 | 0.000000000E+00 | 0.000000000E+00 | 0.000000000E+00 | 0.000000000E+00 | 0.000000000E+00 | 0.000000000E+00 | 0.000000000E+00 |

FIG. 36

| Element | Material Nd | Material νd | Surface | Curvature [mm⁻¹] | Center thickness [mm] | Effective radius [mm] | Conic coefficient | Aspheric coefficient A4 | A6 | A8 | A10 | A12 | A14 | A16 |
|---|---|---|---|---|---|---|---|---|---|---|---|---|---|---|
| L1 | 1.531 | 56 | S1 | 7.23833362E-01 | 0.843 | 0.723 | 0.00E+00 | -3.98000240E-03 | 1.67723918E-01 | -3.19014615E+00 | 1.93918901E+01 | -5.60032321E+01 | 7.76798421E+01 | -4.17883914E+01 |
|  |  |  | S2 | -9.94686478E-02 | 0.058 | 0.773 | 0.00E+00 | -1.32989610E-01 | 9.57028736E-01 | -7.54589345E+00 | 2.74653505E+01 | -5.24564694E+01 | 4.93814488E+01 | -1.75751411E+01 |
| L2 | 1.614 | 26 | S3 | 9.96183532E-02 | 0.279 | 0.772 | 0.00E+00 | -2.50528558E-01 | 1.96672341E+00 | -1.45189517E+01 | 5.47076633E+01 | -1.10567488E+02 | 1.13015527E+02 | -4.52182820E+01 |
|  |  |  | S4 | 4.87324103E-01 | 0.586 | 0.776 | 0.00E+00 | -8.90572943E-02 | 6.97949256E-01 | -3.56556880E+00 | 1.01077457E+01 | -1.38774006E+01 | 7.25336346E+00 | 6.00867443E-01 |
| L3 | 1.531 | 56 | S5 | -3.78436147E-01 | 0.607 | 0.877 | 0.00E+00 | -1.08804754E-01 | -8.46344755E-02 | 3.21345814E-02 | -1.81090781E-04 | 0.00000000E+00 | 0.00000000E+00 | 0.00000000E+00 |
|  |  |  | S6 | -5.96292900E-01 | 0.609 | 1.181 | 0.00E+00 | -2.81657145E-02 | 2.15042917E-02 | -6.55904125E-02 | 2.16785700E-01 | -2.56557674E-01 | 1.77570283E-01 | -4.99865794E-02 |
| L4 | 1.531 | 56 | S7 | -2.01686035E-01 | 0.607 | 1.658 | 0.00E+00 | -2.20591228E-01 | 1.31521228E-01 | -2.02337611E-02 | -8.90840797E-03 | 4.23571451E-03 | -3.88345655E-04 | -3.65234838E-05 |
|  |  |  | S8 | 3.95974374E-01 | 0.395 | 1.996 | 0.00E+00 | -2.40426934E-01 | 1.25309885E-01 | -5.41284670E-02 | 1.44700329E-02 | -2.20475527E-03 | 1.36647328E-04 | 0.00000000E+00 |
| CG | 1.516 | 64 | S9 | 0.00000000E+00 | 0.300 | — | 0.00E+00 | 0.00000000E+00 | 0.00000000E+00 | 0.00000000E+00 | 0.00000000E+00 | 0.00000000E+00 | 0.00000000E+00 | 0.00000000E+00 |
|  |  |  | S10 | 0.00000000E+00 | 0.050 | — | 0.00E+00 | 0.00000000E+00 | 0.00000000E+00 | 0.00000000E+00 | 0.00000000E+00 | 0.00000000E+00 | 0.00000000E+00 | 0.00000000E+00 |
| Sensor | — | — | S11 | 0.00000000E+00 | 0.000 | — | 0.00E+00 | 0.00000000E+00 | 0.00000000E+00 | 0.00000000E+00 | 0.00000000E+00 | 0.00000000E+00 | 0.00000000E+00 | 0.00000000E+00 |

FIG. 37

|  |  | Image sensing lens 100 | Image sensing lens 200 | Image sensing lens 300 | Image sensing lens 400 |
|---|---|---|---|---|---|
| Sensor | Type | 1/4-inch, 5M-class; pixel pitch = 1.4 $\mu$m | | | |
|  | Size | diagonal size = 4.536mm, horizontal size = 3.629mm, vertical size = 2.722mm | | | |
| F number | | 2.80 | 2.80 | 2.80 | 2.80 |
| Focal length f [mm] | | 3.711 | 3.487 | 3.486 | 4.048 |
| Angle of view [deg] | D (diagonal) | 62.8 | 66.1 | 66.1 | 58.2 |
|  | H (horizontal) | 52.1 | 55.1 | 55.1 | 48.1 |
|  | V (vertical) | 40.3 | 42.7 | 42.6 | 37.0 |
| Relative illumination [%] | h0.6 | 77.2 | 75.0 | 75.7 | 79.4 |
|  | h0.8 | 64.5 | 61.4 | 61.9 | 67.7 |
|  | h1.0 | 51.8 | 48.3 | 47.4 | 56.2 |
| Chief ray angle [deg] | h0.6 | 25.9 | 26.3 | 26.4 | 24.3 |
|  | h0.8 | 26.8 | 26.5 | 26.5 | 25.1 |
|  | h1.0 | 23.3 | 22.0 | 22.9 | 22.8 |
| Overall optical length [mm] | | 4.135 | 3.921 | 3.944 | 4.335 |
| CG thickness [mm] | | 0.300 | 0.300 | 0.300 | 0.300 |

FIG. 38

|  | Image sensing lens 100 | Image sensing lens 200 | Image sensing lens 300 | Image sensing lens 400 |
|---|---|---|---|---|
| f1/f | 0.63 | 0.71 | 0.70 | 0.58 |
| f2/f | −1.33 | −1.56 | −1.35 | −1.04 |
| f3/f | 1.15 | 1.16 | 1.06 | 1.74 |
| f4/f | −0.64 | −0.73 | −0.71 | −0.75 |
| $\nu 1 - \nu 2$ | 30 | 30 | 30 | 30 |

FIG. 39

|  |  | Image sensing lens 100 | Image sensing lens 200 | Image sensing lens 300 | Image sensing lens 400 |
|---|---|---|---|---|---|
| Focal length [mm] | L1(f1) | 2.344 | 2.486 | 2.454 | 2.337 |
|  | L2(f2) | −4.939 | −5.438 | −4.718 | −4.218 |
|  | L3(f3) | 4.278 | 4.040 | 3.698 | 7.061 |
|  | L4(f4) | −2.383 | −2.533 | −2.462 | −3.051 |

IMAGE SENSING LENS AND IMAGE SENSING MODULE

This Nonprovisional application claims priority under 35 U.S.C. §119(a) on Patent Application No. 2010-091664 filed in Japan on Apr. 12, 2010, the entire contents of which are hereby incorporated by reference.

TECHNICAL FIELD

The technology present herein relates to an image sensing lens and an image sensing module each to be mounted in, for example, a digital camera of a portable terminal.

BACKGROUND ART

In recent years, various image sensing modules have been developed each of which contains a compact digital camera or a compact digital video unit each including a solid-state image sensing device that includes a CCD (charge coupled device) or a CMOS (complementary metal oxide semiconductor). Since, in particular, portable information terminals and mobile telephones are now in widespread use, there is a demand that such portable information terminals and mobile telephones should each include an image sensing module which is compact and which has a reduced height and a great resolving power.

An image sensing lens including four lenses, which is compact and which has good optical characteristics, has been drawing attention as an image sensing lens that can meet the above demand.

The image sensing lens including four lenses has a lot of applications which range from a module including a 5M (mega)-class sensor to a camera module (image sensing module) having a large number of pixels. Such a camera module particularly has a larger number of pixels and is smaller in height recently. This trend will continue to increase the demand for the above image sensing lens for use in a camera module having a large number of pixels.

The image sensing lens, which is mounted in a middle-class to high-end model camera, will mostly be (i) a "4P" lens, that is, a lens including four plastic lenses, or (ii) a "1G3P" lens, that is, a lens including one glass lens and three plastic lenses. This is because the above image sensing lens, if including more or fewer than four lenses, will be difficult to produce in terms of its production cost and size.

It is true that 1G3P lenses seem to be a promising option in view of good optical characteristics of a glass material. There is, however, concern about an increase in cost and a decrease in productivity in a case where a glass material is used. Thus, 1G3P lenses will be used for only limited models. The image sensing lens including four lenses will therefore be a 4P lens for most applications.

Patent Literatures 1 through 14, for example, disclose respective conventional image sensing lenses each including four lenses.

CITATION LIST

Patent Literature 1
Japanese Patent Application Publication, Tokukai, No. 2005-24581 A (Publication Date: Jan. 27, 2005)
Patent Literature 2
Japanese Patent Application Publication, Tokukai, No. 2005-24889 A (Publication Date: Jan. 27, 2005)
Patent Literature 3
Japanese Patent Application Publication, Tokukai, No. 2006-317916 A (Publication Date: Nov. 24, 2006)
Patent Literature 4
Japanese Patent Application Publication, Tokukai, No. 2007-65374 A (Publication Date: Mar. 15, 2007)
Patent Literature 5
Japanese Patent Application Publication, Tokukai, No. 2008-33376 A (Publication Date: Feb. 14, 2008)
Patent Literature 6
Japanese Patent Application Publication, Tokukai, No. 2008-46526 A (Publication Date: Feb. 28, 2008)
Patent Literature 7
Japanese Patent Application Publication, Tokukai, No. 2008-107616 A (Publication Date: May 8, 2008)
Patent Literature 8
Japanese Patent Application Publication, Tokukai, No. 2008-242180 A (Publication Date: Oct. 9, 2008)
Patent Literature 9
Japanese Patent Application Publication, Tokukai, No. 2008-281873 A (Publication Date: Nov. 20, 2008)
Patent Literature 10
Japanese Patent Application Publication, Tokukai, No. 2009-14899 A (Publication Date: Jan. 22, 2009)
Patent Literature 11
Japanese Patent Application Publication, Tokukai, No. 2009-53592 A (Publication Date: Mar. 12, 2009)
Patent Literature 12
Japanese Patent Application Publication, Tokukai, No. 2009-251515 A (Publication Date: Oct. 29, 2009)
Patent Literature 13
Japanese Patent Application Publication, Tokukai, No. 2009-258286 A (Publication Date: Nov. 5, 2009)
Patent Literature 14
Japanese Patent Application Publication, Tokukai, No. 2009-282223 A (Publication Date: Dec. 3, 2009)

SUMMARY

The image sensing lenses disclosed in respective Patent Literatures 1 through 14 cause problems below.

The image sensing lenses disclosed in respective Patent Literatures 1 through 3 and 6 through 13 each cause a problem that aberrations, particularly distortion and curvature of field, occurring outside an optical axis of the image sensing lens cannot be corrected sufficiently.

The image sensing lenses disclosed in respective Patent Literatures 4, 5, 7, and 14 each cause a problem that chromatic aberration cannot be corrected sufficiently.

The image sensing lens disclosed in Patent Literature 9 causes a problem that since its entrance pupil is near an image surface, it is difficult to simultaneously (i) reduce a height of the image sensing lens and (ii) reduce an angle of incidence of light rays on the image surface.

The image sensing lens disclosed in Patent Literature 14 causes a problem that since a focal length of a first lens, that is, a refracting power thereof, is not optimally distributed, it is difficult to (i) correct coma aberration, spherical aberration, and chromatic aberration and (ii) reduce a height of the image sensing lens.

As described above, the image sensing lenses disclosed in respective Patent Literatures 1 through 14 all raise a problem that it is difficult to produce an image sensing lens including four lenses which corrects aberrations well and has a great resolving power and a reduced height.

The present technology has been accomplished in view of the above problems. It is an object of the present technology to provide an image sensing lens and an image sensing module each of which includes four lenses and each of which corrects aberrations well and has a great resolving power and a reduced height.

In order to solve the above problems, an image sensing lens an example embodiment presented herein includes, in an order below along a direction from an object to an image surface: an aperture stop; a first lens having a positive refracting power; a second lens having a negative refracting power; a third lens having a positive refracting power; and a fourth lens having a negative refracting power, the second lens having an image-side surface facing the image surface, the image-side surface being a concave surface, the third lens being a meniscus lens having an image-side surface facing the image surface, the image-side surface being a convex surface, the fourth lens having (i) an object-side surface facing the object, the object-side surface being a concave surface, and (ii) an image-side surface facing the image surface, the image-side surface being concave at a central portion and convex at a peripheral portion around the central portion, the image-side surface of the third lens being an aspheric surface, the object-side surface and the image-side surface of the fourth lens being each an aspheric surface, the image sensing lens satisfying Formulae (1) through (3) below, $$0.51 < f1/f < 0.78 \quad (1)$$

$$-1.63 < f2/f < -0.97 \quad (2)$$

$$v1 - v2 > 20 \quad (3),$$

where f is a focal length of the image sensing lens; f1 is a focal length of the first lens; f2 is a focal length of the second lens; v1 is an Abbe number of the first lens; and v2 is an Abbe number of the second lens.

With the above arrangement, the image sensing lens, which includes the aperture stop provided the farthest toward the object side in the image sensing lens, has an entrance pupil away from the image surface. As such, it is possible to (i) reduce an overall length of the image sensing lens, and (ii) reduce an angle of incidence of light rays upon the image surface.

The first lens has a positive refracting power. The second lens has a negative refracting power, and has a concave surface facing the image surface. Further, the first and second lenses are made of a low-dispersion material and a high-dispersion material, respectively, so that a difference between the respective Abbe numbers of the first and second lenses exceeds 20 as defined in Formula (3). With this arrangement, the image sensing lens of the present invention can correct chromatic aberration well.

The third lens, with a positive refracting power, is a meniscus lens having a convex surface facing the image surface. The fourth lens, with a negative refracting power, has (i) a concave surface facing the object and (ii) another surface facing the image surface which surface is concave at its central portion and convex at its peripheral portion, and which has an inflection point (reversed surface). This arrangement is effective in correcting aberrations which occur outside the optical axis of the image sensing lens. In particular, it is possible to correct distortion and curvature of field well.

The respective focal lengths of the first and second lenses are set as defined in Formulae (1) and (2), respectively, relative to the focal length f of the image sensing lens. With this arrangement, it is possible to produce an image sensing lens in which (i) chromatic aberration is corrected with use of a combination of the respective materials of the first and second lenses, and additionally (ii) other aberrations are corrected well.

If f1/f is not greater than 0.51, the image sensing lens will have an excessively large power (refracting power) distribution for the first lens. As such, it will be difficult to correct coma aberration, spherical aberration, and chromatic aberration.

If f1/f is not smaller than 0.78, the image sensing lens will have an excessively small power distribution for the first lens, and will consequently have an increased overall length. This will make it difficult to reduce the height of the image sensing lens.

If f2/f is not greater than −1.63, it will be difficult to correct chromatic aberration in the image sensing lens to achieve a good balance.

If f2/f is not smaller than −0.97, the second lens of the image sensing lens will have an excessively large negative refracting power. This will in turn increase aberrations which occur outside the optical axis of the image sensing lens.

If v1−v2 is not greater than 20, a combination of the first and second lenses of the image sensing lens will have a smaller achromatic effect. As such, it will be difficult to correct chromatic aberration.

Thus, the image sensing lens of the present embodiment including the four lenses, namely the first, second, third, and fourth lenses, is an image sensing lens in which aberrations are corrected well and which has a great resolving power and a reduced height.

An image sensing module of the present embodiment includes: the image sensing lens of the present invention; and a solid-state image sensing device for receiving, as a light signal, light of an image formed by the image sensing lens.

According to the above arrangement, the image sensing module achieves effects similar to those achieved by the image sensing lens of the present invention, and thus allows production of a compact camera module having a great resolving power.

As described above, the image sensing lens of the present embodiment includes, in an order below along a direction from an object to an image surface: an aperture stop; a first lens having a positive refracting power; a second lens having a negative refracting power; a third lens having a positive refracting power; and a fourth lens having a negative refracting power, the second lens having an image-side surface facing the image surface, the image-side surface being a concave surface, the third lens being a meniscus lens having an image-side surface facing the image surface, the image-side surface being a convex surface, the fourth lens having (i) an object-side surface facing the object, the object-side surface being a concave surface, and (ii) an image-side surface facing the image surface, the image-side surface being concave at a central portion and convex at a peripheral portion around the central portion, the image-side surface of the third lens being an aspheric surface, the object-side surface and the image-side surface of the fourth lens being each an aspheric surface, the image sensing lens satisfying Formulae (1) through (3) below, $$0.51 < f1/f < 0.78 \quad (1)$$

$$-1.63 < f2/f < -0.97 \quad (2)$$

$$v1 - v2 > 20 \quad (3),$$

where f is a focal length of the image sensing lens; f1 is a focal length of the first lens; f2 is a focal length of the second lens; v1 is an Abbe number of the first lens; and v2 is an Abbe number of the second lens.

As such, according to the present embodiment, it is possible to provide an image sensing lens and an image sensing module each of which includes four lenses and each of which corrects aberrations well and has a great resolving power and a reduced height.

BRIEF DESCRIPTION OF DRAWINGS

FIG. 1 is a cross-sectional view illustrating a configuration of an image sensing lens in accordance with an embodiment.

FIG. 2 is a cross-sectional view illustrating a configuration of an image sensing lens in accordance with the embodiment.

FIG. 3 is a cross-sectional view illustrating a configuration of an image sensing lens in accordance with the embodiment.

FIG. 33 is a table showing design data of the image sensing lens of FIG. 1.

FIG. 34 is a table showing design data of the image sensing lens of FIG. 2.

FIG. 35 is a table showing design data of the image sensing lens of FIG. 3.

FIG. 36 is a table showing design data of the image sensing lens of FIG. 4.

FIG. 37 is a table showing example specifications of image sensing modules each including (i) one of the image sensing lenses illustrated in FIGS. 1 through 4, respectively, and (ii) a solid-state image sensing device placed at an image surface.

FIG. 38 is a table showing respective values of f1/f, f2/f, f3/f, f4/f, and v1−v2 for each of the image sensing lenses illustrated in FIGS. 1 through 4, respectively.

FIG. 39 is a table showing, for each of the image sensing lenses illustrated in FIGS. 1 through 4, respectively, respective values of (i) a focal length of a first lens, (ii) a focal length of a second lens, (iii) a focal length of a third lens, and (iv) a focal length of a fourth lens.

DESCRIPTION OF EMBODIMENTS

Figure 4:
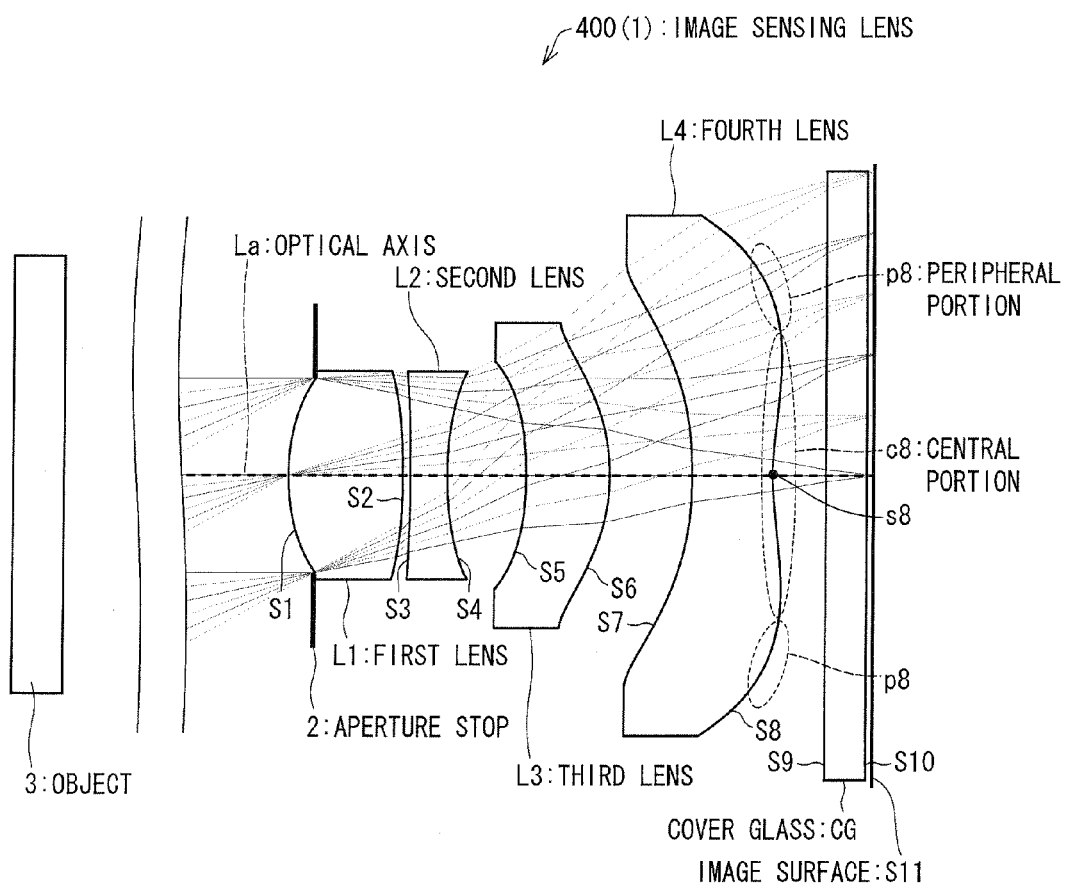
FIG. 4 is a cross-sectional view illustrating a configuration of an image sensing lens in accordance with the embodiment.

The following description deals with an image sensing lens 1 according to an embodiment with reference to FIGS. 1 through 39. The image sensing lens 1 can be produced, according to specific design, in four different forms: image sensing lenses 100, 200, 300, and 400. The description below uses the term "image sensing lens 1" to collectively refer to the image sensing lenses 100, 200, 300, and 400.

FIG. 1 is a cross-sectional view illustrating a configuration of the image sensing lens 100.

FIG. 2 is a cross-sectional view illustrating a configuration of the image sensing lens 200.

FIG. 3 is a cross-sectional view illustrating a configuration of the image sensing lens 300.

FIG. 4 is a cross-sectional view illustrating a configuration of the image sensing lens 400.

The image sensing lenses 100, 200, 300, and 400 each have a basic configuration described below.

[Basic Configuration of Image Sensing Lens 1]

FIGS. 1 through 4 are each a cross-sectional view of the image sensing lens 1 taken along a Y direction (vertical direction in the figures) and a Z direction (horizontal direction in the figures). The Z direction refers to (i) a direction which extends from an object 3 side toward an image surface S11 side and (ii) a direction which extends from the image surface S11 side toward the object 3 side. The image sensing lens 1 has its optical axis La which extends in the Z direction. A line normal to the optical axis La of the image sensing lens 1 extends in a direction which linearly extends from a point on the optical axis La along a plane defined by an X direction (which is perpendicular to the figures) and the Y direction.

The image sensing lens 1 includes: an aperture stop 2; a first lens L1; a second lens L2; a third lens L3; a fourth lens L4; and a cover glass CG, in that order from the object 3 side to the image surface S11 side.

The aperture stop 2 is provided specifically at a periphery of a surface 51 (object-side surface) of the first lens L1 which surface 51 faces the object 3 side. The aperture stop 2 serves to limit a diameter of a bundle of rays on an axis of light incident on the image sensing lens 1 so that the incident light can appropriately pass through the first, second, third, and fourth lenses L1, L2, L3, and L4.

The object 3 is a target object of which the image sensing lens 1 forms an image. In other words, the object 3 is an object of which the image sensing lens 1 senses an image. For convenience of explanation, FIGS. 1 through 4 each illustrate the object 3 being extremely close to the image sensing lens 1. The object 3 is, in practice, separated from the image sensing lens 1 by a distance as large as an infinite distance, for example.

The first lens L1 is a lens having a positive refracting power. The first lens L1 has (i) the surface S1 facing the object 3 side and (ii) a surface S2 (image-side surface) facing the image surface S11 side, and neither of the surfaces S1 and S2 is particularly limited in shape. However, at least the surface S1 is preferably a convex surface. Further, the surfaces S1 and S2 of the first lens L1 are preferably both aspheric surfaces. This facilitates better correcting aberrations which may occur in the image sensing lens 1.

Specifically, the aperture stop 2 is provided so that the convex surface S1 of the first lens L1 protrudes toward the object 3 side beyond the aperture stop 2. The present invention is, however, not particularly limited as to whether the surface S1 protrudes toward the object 3 side beyond the aperture stop 2 as such. The aperture stop 2 is simply required to be provided at a typical location which is further toward the object 3 side than a typical location of the first lens L1.

The second lens L2 is a lens having a negative refracting power. The second lens L2 has (i) a surface S3 facing the object 3 side, which surface S3 is not particularly limited in shape, and (ii) a surface S4 facing the image surface S11 side, which surface S4 is a concave surface. At least one of the surfaces S3 and S4 of the second lens L2, particularly the surface S4, is preferably an aspheric surface. This facilitates better correcting aberrations which may occur in the image sensing lens 1.

The third lens L3 is a known meniscus lens, and has a positive refracting power. The third lens L3 has (i) a surface S5 facing the object 3 side, which surface S5 corresponds to a concave surface of the meniscus lens, and (ii) a surface S6 facing the image surface S11 side, which surface S6 corresponds to a convex surface of the meniscus lens. The surface S6 of the third lens L3 needs to be an aspheric surface, whereas the surface S5 thereof is preferably an aspheric surface. This facilitates better correcting aberrations which may occur in the image sensing lens 1.

The term "concave surface of a lens" refers to a portion of the lens which portion curves so as to form a hollow, that is, an inwardly curved portion of the lens. The term "convex surface of a lens" refers to a spherical surface of the lens which spherical surface curves outwardly.

The fourth lens L4 is a lens having a negative refracting power. The fourth lens L4 has a surface S7 facing the object 3 side, which surface S7 is a concave surface. Further, the fourth lens L4 has a surface S8 facing the image surface S11 side, which surface S8 is (i) concave at its central portion c8 corresponding to a center s8 of the surface S8 and a portion around the center s8, and (ii) convex at a peripheral portion p8 around the central portion c8. In other words, the surface S8 of the fourth lens L4 can be construed as a curved surface which has an inflection point that divides the surface S8 into the depressed central portion c8 and the protruding peripheral portion p8. The inflection point refers to a point on an aspheric surface which point is present on a curve of a cross-sectional shape of the lens within an effective radius of the lens and at which point a plane tangent to a vertex of the aspheric surface is a plane perpendicular to the optical axis.

In the image sensing lens 1, the fourth lens L4 having the surface S8 with the inflection point allows (i) light rays passing through the central portion c8 to form an image further on the object 3 side in the Z direction, and (ii) light rays passing through the peripheral portion p8 to form an image further on the image surface S11 side in the Z direction. As such, in the image sensing lens 1, it is possible to correct aberrations such as curvature of field in accordance with respective specific shapes of the concavity of the central portion c8 and the convexity of the peripheral portion p8.

The surfaces S7 and S8 of the fourth lens L4 are both aspheric surfaces. This facilitates better correcting aberrations which may occur in the image sensing lens 1.

The cover glass CG is provided between the fourth lens L4 and the image surface S11. The cover glass CG covers the image surface S11 so as to protect the image surface S11 from, for example, physical damage. The cover glass CG has (i) a surface S9 (object-side surface) facing the object 3 side and a surface S10 (image-side surface) facing the image surface S11 side.

The image surface S11 is a surface which is perpendicular to the optical axis La of the image sensing lens 1 and on which an image is formed. A real image can be observed on a screen (not shown) placed at the image surface S11. In an image sensing module including the image sensing lens 1, a solid-state image sensing device is placed at the image surface S11.

The image sensing lens 1 having the above basic configuration satisfies Formulae (1) through (5) below.

$$0.51 < f1/f < 0.78 \quad (1)$$

$$-1.63 < f2/f < -0.97 \quad (2)$$

$$v1 - v2 > 20 \quad (3)$$

$$0.91 < f3/f < 1.89 \quad (4)$$

$$-0.9 < f4/f < -0.49 \quad (5)$$

In the above Formulae, the individual symbols represent the following:
f: Focal length of the image sensing lens 1 (the entire lens system)
f1: Focal length of the first lens L1
f2: Focal length of the second lens L2
f3: Focal length of the third lens L3
f4: Focal length of the fourth lens L4
v1: Abbe number of the first lens L1
v2: Abbe number of the second lens L2

In the image sensing lens of the present invention, the focal lengths f and f1 through f4 are normally expressed in mm (millimeters), whereas the Abbe numbers v1 and v2 are unit-less numbers.

A lens with a focal length of a positive value is a lens having a positive refracting power, whereas a lens with a focal length of a negative value is a lens having a negative refracting power. An Abbe number is a constant of an optical medium which constant indicates a ratio of a refractive index of light to dispersion of the light. In other words, an Abbe number indicates a degree to which light rays of different wavelengths are refracted in different directions. A medium with a high Abbe number is low in dispersion caused by refraction of light rays of different wavelengths.

The image sensing lens 1, which includes the aperture stop 2 provided the farthest toward the object 3 side in the image sensing lens 1, has an entrance pupil away from the image surface S11. As such, it is possible to (i) reduce an overall length of the image sensing lens 1, and (ii) reduce an angle of incidence of light rays upon the image surface S11.

The first and second lenses L1 and L2 are made of a low-dispersion material and a high-dispersion material, respectively, so that a difference between the respective Abbe numbers v1 and v2 of the first and second lenses L1 and L2 exceeds 20 as defined in Formula (3). With this arrangement, the image sensing lens 1 can correct chromatic aberration well.

The respective configurations of the third and fourth lenses L3 and L4 are effective in correcting aberrations which occur outside a range of the optical axis La of the image sensing lens 1. In particular, it is possible to correct distortion and curvature of field well.

The respective focal lengths f1 and f2 of the first and second lenses L1 and L2 are set as defined in Formulae (1) and (2), respectively, relative to the focal length f of the image sensing lens 1. With this arrangement, it is possible to produce an image sensing lens 1 in which (i) chromatic aberration is corrected with use of a combination of the respective materials of the first and second lenses L1 and L2, and additionally (ii) other aberrations are corrected well.

If f1/f is not greater than 0.51 in Formula (1), the image sensing lens will have an excessively large power (refracting power) distribution for the first lens L1. As such, it will be difficult to correct coma aberration, spherical aberration, and chromatic aberration.

If f1/f is not smaller than 0.78 in Formula (1), the image sensing lens will have an excessively small power distribution for the first lens L1, and will consequently have an increased overall length. This will make it difficult to reduce the length of the image sensing lens.

If f2/f is not greater than −1.63 in Formula (2), it will be difficult to correct chromatic aberration in the image sensing lens to achieve a good balance.

If f2/f is not smaller than −0.97 in Formula (2), the second lens L2 of the image sensing lens will have an excessively large negative refracting power. This will in turn increase aberrations which occur outside the range of the optical axis La of the image sensing lens.

If v1−v2 is not greater than 20 in Formula (3), a combination of the first and second lenses L1 and L2 of the image sensing lens will have a smaller achromatic effect. As such, it will be difficult to correct chromatic aberration.

Thus, the image sensing lens 1 including the four lenses, namely the first, second, third, and fourth lenses L1, L2, L3, and L4, is an image sensing lens in which aberrations are corrected well and which has a great resolving power and a reduced height.

In addition, the image sensing lens 1, which satisfies Formulae (4) and (5), is further effective in correcting aberrations which occur outside the range of the optical axis La. In particular, it is possible to better correct distortion and curvature of field.

The image sensing lens 1 is preferably a so-called 4P image sensing lens in which the first, second, third, and fourth lenses L1, L2, L3, and L4 are each made of plastic.

With the 4P configuration of the image sensing lens, it is possible to produce an image sensing lens 1 at a reduced production cost. Generally, it is possible to select a material having a smaller chromatic dispersion in a case where a glass lens is used as each of the first, second, third, and fourth lenses L1, L2, L3, and L4 than in a case where a plastic lens is used as each of the above lenses. The use of a glass lens is, on the other hand, disadvantageous in that a glass lens requires a higher production cost due to a glass material and a process applied. The image sensing lens 1 is configured so that the combination of the first and second lenses L1 and L2 achieves a sufficient achromatic effect. As such, even in a case where each of the lenses is made of plastic, it is possible to produce an image sensing lens 1 in which chromatic aberration is corrected well.

The image sensing lens 1 preferably has an F number of smaller than 3.5. As such, it is possible to (i) increase an amount of received light and (ii) correct chromatic aberration well. Thus, it is possible to achieve a great resolving power. The image sensing lens 1 particularly preferably has an F number of 2.8. An F number indicates an amount of brightness of an optical system. The F number of the image sensing lens 1 is expressed as a value obtained by dividing an equivalent focal length of the image sensing lens 1 by an entrance pupil diameter of the image sensing lens 1.

[Optical Characteristics of Image Sensing Lens 100]

Figure 5:
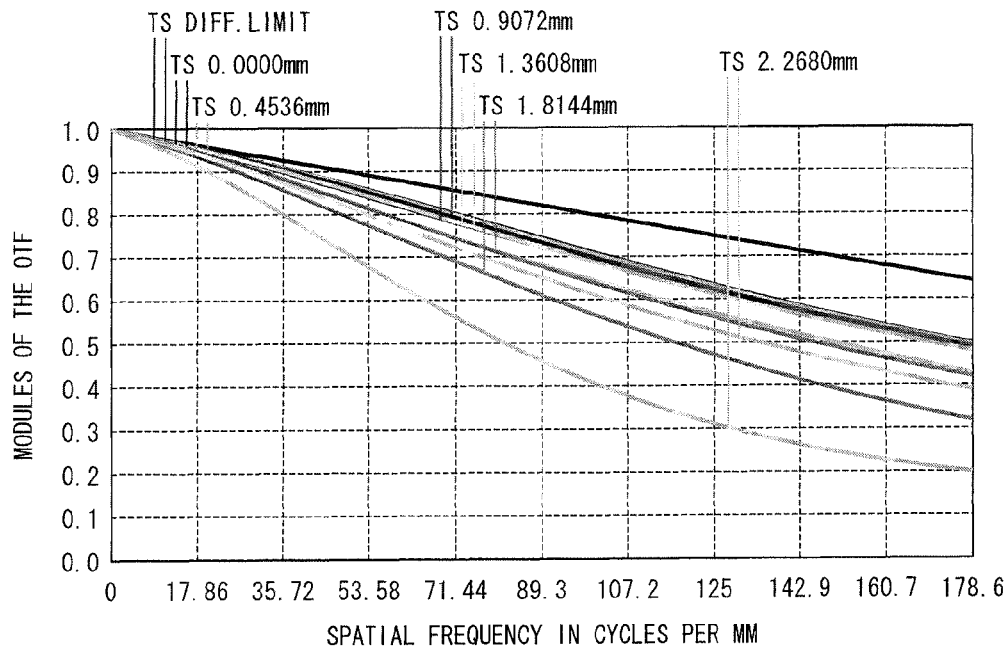
FIG. 5 is a graph illustrating an MTF (modulation transfer function)-spatial frequency characteristic of the image sensing lens of FIG. 1.

FIG. 5 is a graph illustrating a relation observed in the image sensing lens 100 between (i) MTF (unit: not applicable) shown on a vertical axis, and (ii) a spatial frequency (unit: 1 p/mm) shown on a horizontal axis.

Figure 6:
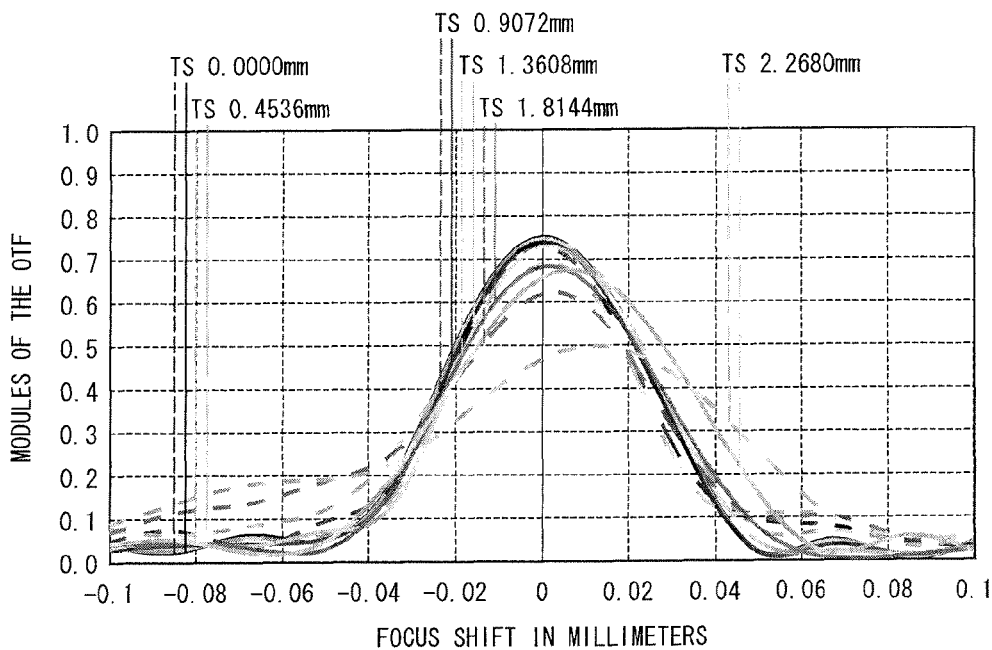
FIG. 6 is a graph illustrating defocus MTF of the image sensing lens of FIG. 1.

FIG. 6 is a graph illustrating defocus MTF of the image sensing lens 100, that is, a relation observed in the image sensing lens 100 between (i) MTF shown on a vertical axis and (ii) a focus shift location (unit: mm) shown on a horizontal axis.

Figure 7:
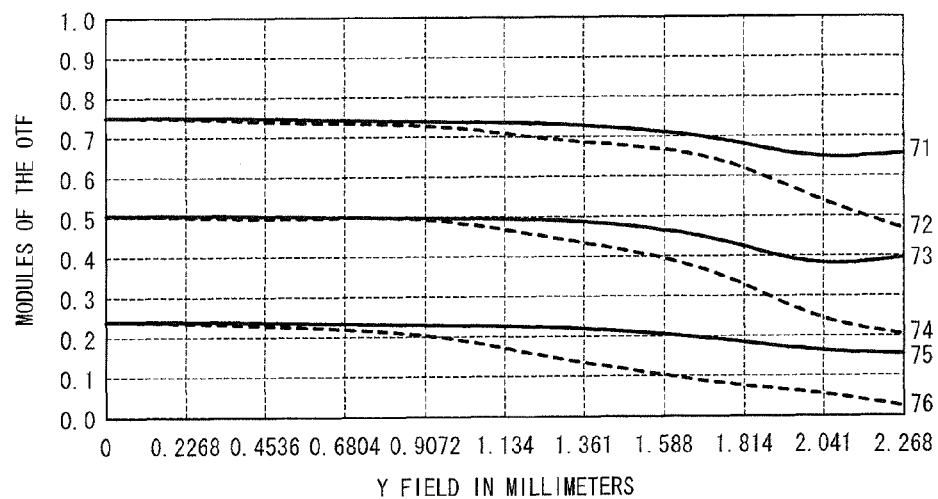
FIG. 7 is a graph illustrating an MTF-image height characteristic of the image sensing lens of FIG. 1.

FIG. 7 is a graph illustrating a relation observed in the image sensing lens 100 between (i) MTF shown on a vertical axis and (ii) an image height (unit: mm) shown on a horizontal axis.

Figure 8:
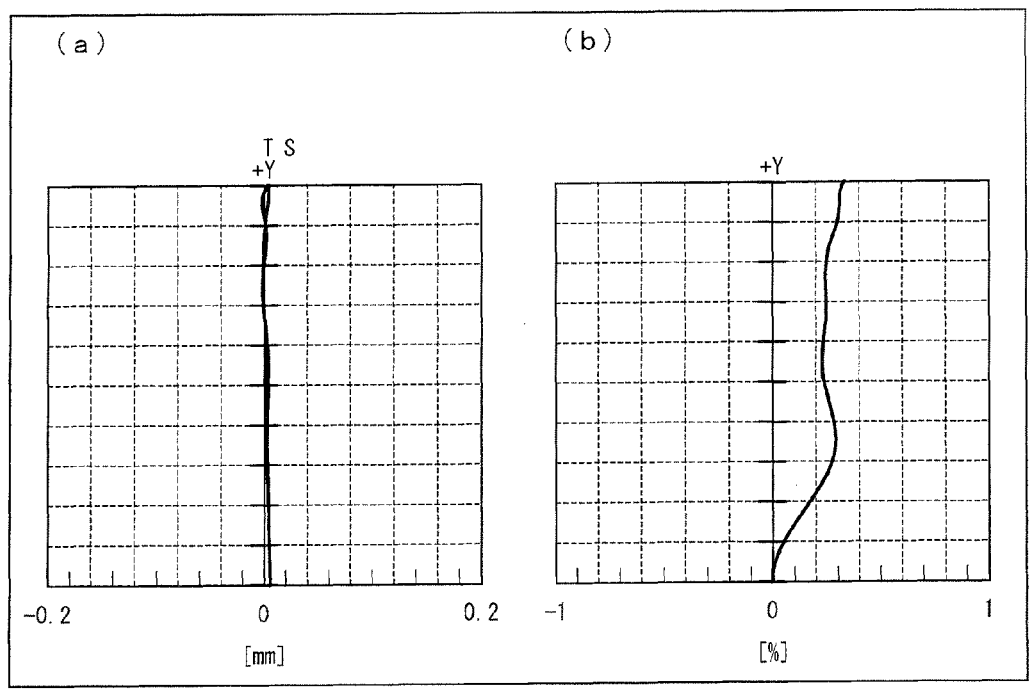
FIG. 8 shows graphs illustrating aberration characteristics of the image sensing lens of FIG. 1, where (a) shows an astigmatism characteristic, and (b) shows a distortion characteristic.

FIG. 8 shows graphs illustrating aberration characteristics of the image sensing lens 100, where (a) shows an astigmatism characteristic and (b) shows a distortion characteristic.

Figure 9:
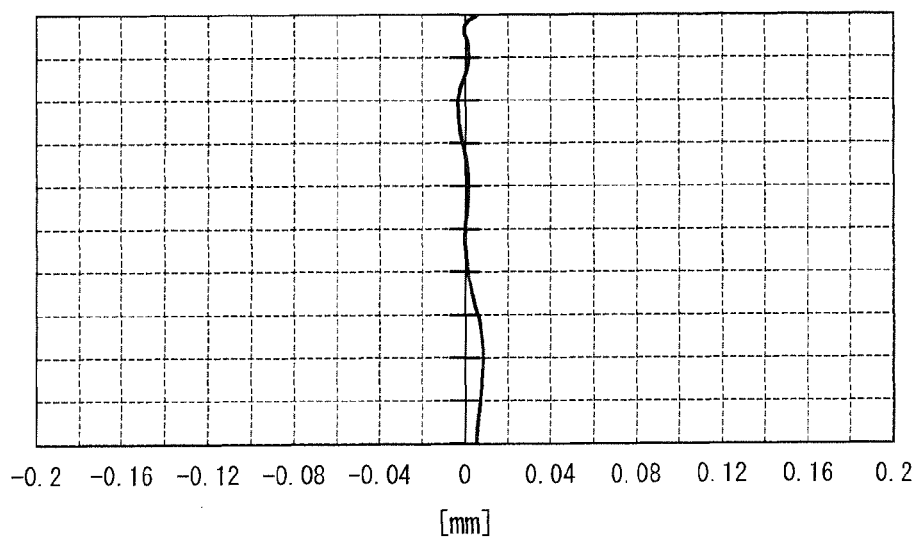
FIG. 9 is a graph illustrating a spherical aberration characteristic of the image sensing lens of FIG. 1.

FIG. 9 is a graph illustrating a spherical aberration characteristic of the image sensing lens 100.

Figure 10:
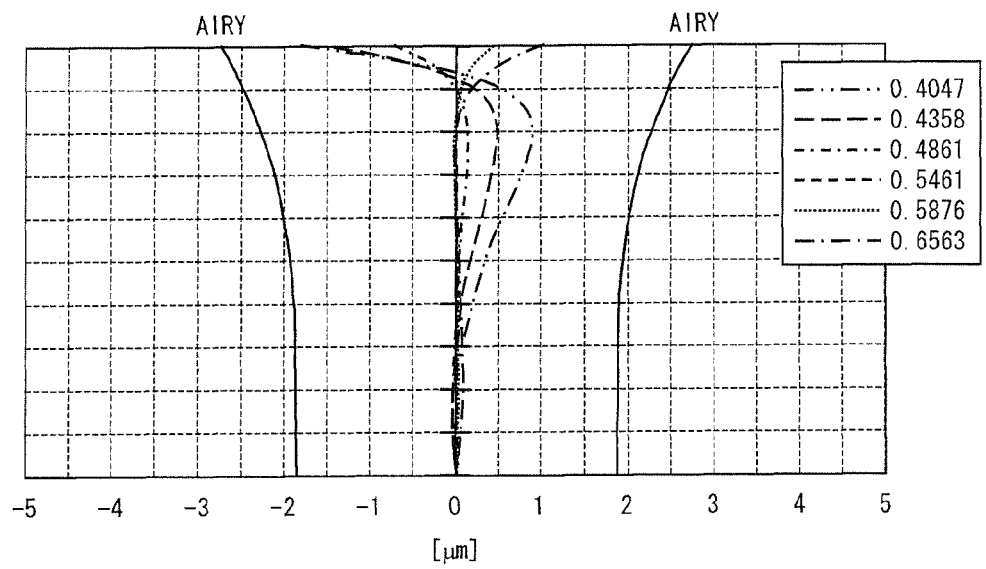
FIG. 10 is a graph illustrating a chromatic aberration characteristic of the image sensing lens of FIG. 1.

FIG. 10 is a graph illustrating a chromatic aberration characteristic of the image sensing lens 100.

Figure 11:
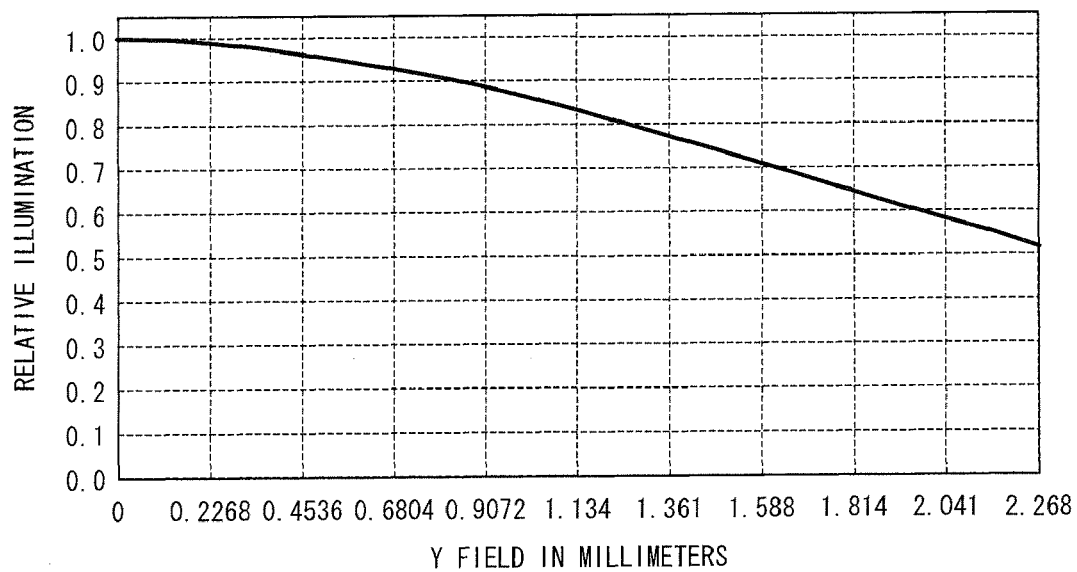
FIG. 11 is a graph illustrating a relative illumination characteristic of the image sensing lens of FIG. 1.

FIG. 11 is a graph illustrating a relative illumination characteristic of the image sensing lens 100.

Each image height shown in the present embodiment expresses in absolute value the height of an image, formed of the object 3 by the image sensing lens 1, with reference to the center of the image. The image height can alternatively express the height of an image in proportion relative to the maximum image height. In the case where the image height expresses the height of an image in proportion relative to the maximum image height, the proportion corresponds to the absolute value as below.

0.0000 mm=image height h0 (center of an image)

0.2268 mm=image height h0.1 (height from the center of an image which height is equivalent to 10% of the maximum image height)

0.4536 mm=image height h0.2 (height from the center of an image which height is equivalent to 20% of the maximum image height)

0.9072 mm=image height h0.4 (height from the center of an image which height is equivalent to 40% of the maximum image height)

1.361 mm=image height h0.6 (height from the center of an image which height is equivalent to 60% of the maximum image height)

1.814 mm=image height h0.8 (height from the center of an image which height is equivalent to 80% of the maximum image height)

2.268 mm=image height h1.0 (maximum image height)

FIG. 5 as well as FIGS. 12, 19, and 26 referred to later illustrates example characteristics observed on a tangential image surface (T) and a sagittal image surface (S) for each of the image heights h0, h0.2, h0.4, h0.6, h0.8, and h1.0 in a case where the spatial frequency falls within a range from 0 to a Nyquist frequency/2.

FIG. 6 as well as FIGS. 13, 20, and 27 referred to later illustrates example characteristics observed on the tangential image surface (T) and the sagittal image surface (S) for each of the image heights h0, h0.2, h0.4, h0.6, h0.8, and h1.0 in a case where the spatial frequency is equal to the Nyquist frequency/4.

FIG. 7 as well as FIGS. 14, 21, and 28 referred to later illustrates example characteristics observed on the tangential image surface and the sagittal image surface for the image heights h0 through h1.0 in (i) the case where the spatial frequency is equal to the Nyquist frequency/4, (ii) a case where the spatial frequency is equal to the Nyquist frequency/2, and (iii) a case where the spatial frequency is equal to the Nyquist frequency.

The above Nyquist frequency corresponds to a Nyquist frequency of a sensor (solid-state image sensing device) which can be suitably combined with the image sensing lens 1, and indicates a value of a resolvable spatial frequency which value is calculated on the basis of a pixel pitch of the sensor. Specifically, the Nyquist frequency Nyq. (unit: 1 p/mm) of the sensor is calculated by Nyq.=1/(sensor pixel pitch)/2.

It is assumed that the characteristics indicated in FIGS. 5 through 32 have been measured with use of a ¼-inch, 5M (mega)-class sensor having a pixel size (pixel pitch) of 1.4 μm, a D (diagonal) size of 4.536 mm, an H (horizontal) size of 3.629 mm, and a V (vertical) size of 2.722 mm.

To obtain the characteristics indicated in FIGS. 5 through 32, it is assumed that an object distance is an infinite distance and that a source of white light according to weighting below (that is, white light made up of different wavelengths mixed at proportions adjusted as below) has been used as a simulation light source (not shown).

404.66 nm=0.13
435.84 nm=0.49
486.1327 nm=1.57
546.07 nm=3.12
587.5618 nm=3.18
656.2725 nm=1.51

As illustrated in FIG. 5, the image sensing lens 100 exhibits a high MTF characteristic of 0.2 or greater for both the tangential image surface and the sagittal image surface at any of the image heights h0 to h1.0. The image sensing lens 100 thus forms an image of the object 3 with an overall resolving power which is good for every portion from the center of the image to the periphery thereof.

As illustrated in FIG. 6, the image sensing lens 100 exhibits, on the image surface S11 (see FIG. 1) corresponding to a focus shift location of 0 mm, a high MTF characteristic of 0.2 or greater for both the tangential image surface and the sagittal image surface at any of the image heights h0 to h1.0. The image sensing lens 100 thus forms an image of the object 3 with an overall resolving power which is good for every portion from the center of the image to the periphery thereof.

FIG. 7 shows a curve 75, which indicates MTF of the image sensing lens 100 for the sagittal image surface at a spatial frequency corresponding to the Nyquist frequency. The curve 75 indicates that the MTF is slightly low at the image height h0.7 (1.588 mm) or greater. FIG. 7 further shows a curve 76, which indicates MTF of the image sensing lens 100 for the tangential image surface at the same spatial frequency. The curve 76 indicates that the MTF is slightly low at the image height h0.4 (0.9072 mm) or greater.

FIG. 7 shows (i) a curve 71, which indicates MTF of the image sensing lens 100 for the sagittal image surface at a spatial frequency corresponding to the Nyquist frequency/4 and (ii) a curve 72, which indicates MTF of the image sensing lens 100 for the tangential image surface at the same spatial frequency. The curves 71 and 72 indicate that the image sensing lens 100 exhibits a high MTF characteristic of 0.2 or greater at any of the image heights h0 to h1.0 (2.268 mm). FIG. 7 further shows (i) a curve 73, which indicates MTF of the image sensing lens 100 for the sagittal image surface at a spatial frequency corresponding to the Nyquist frequency/2 and (ii) a curve 74, which indicates MTF of the image sensing lens 100 for the tangential image surface at the same spatial frequency. The curves 73 and 74 similarly indicate that the image sensing lens 100 exhibits a high MTF characteristic of 0.2 or greater at any of the image heights h0 to h1.0 (2.268 mm). As compared to conventional image sensing lenses, the image sensing lens 100 thus forms an image of the object 3 with an overall resolving power which is good for every portion from the center of the image to the periphery thereof.

The respective graphs of (a) and (b) of FIG. 8 and FIGS. 9 and 10 each show (i) on a vertical axis, an image height and (ii) on a horizontal axis, how light rays of different wavelengths are displaced in a direction normal to the optical axis La. The graph of FIG. 10 shows diffraction limits with two respective curves (indicated by reference code AIRY) on left and right sides.

The respective graphs of (a) and (b) of FIG. 8 and FIG. 9 show only small amounts of remaining aberrations (small difference in magnitude of each aberration in the direction normal to the optical axis La). This indicates that the image sensing lens 100 has good optical characteristics.

The graph of FIG. 10 indicates that chromatic aberration is corrected well even near the diffraction limits. This in turn indicates that the image sensing lens 100 has good optical characteristics.

The graph of FIG. 11 shows (i) on a horizontal axis, an image height and (ii) on a vertical axis, a proportion of a light amount for an image height relative to a light amount on the optical axis La (that is, the image height h0).

A general image sensing lens has a relative illumination, that is, a light amount, which decreases toward the periphery of an image (that is, with a larger image height). Although this is also true of the image sensing lens 100, the image sensing lens 100 exhibits, as the graph of FIG. 11 shows, no rapid decrease in light amount toward the periphery of an image, and thus maintains a high relative illumination even at the periphery of an image. This indicates that the image sensing lens 100 has a good relative illumination characteristic.

The image sensing lens 100 can be construed, among the other image sensing lenses 1, as having a normal view angle design, that is, as having a normal angle of view.

[Optical Characteristics of Image Sensing Lens 200]

Figure 12:
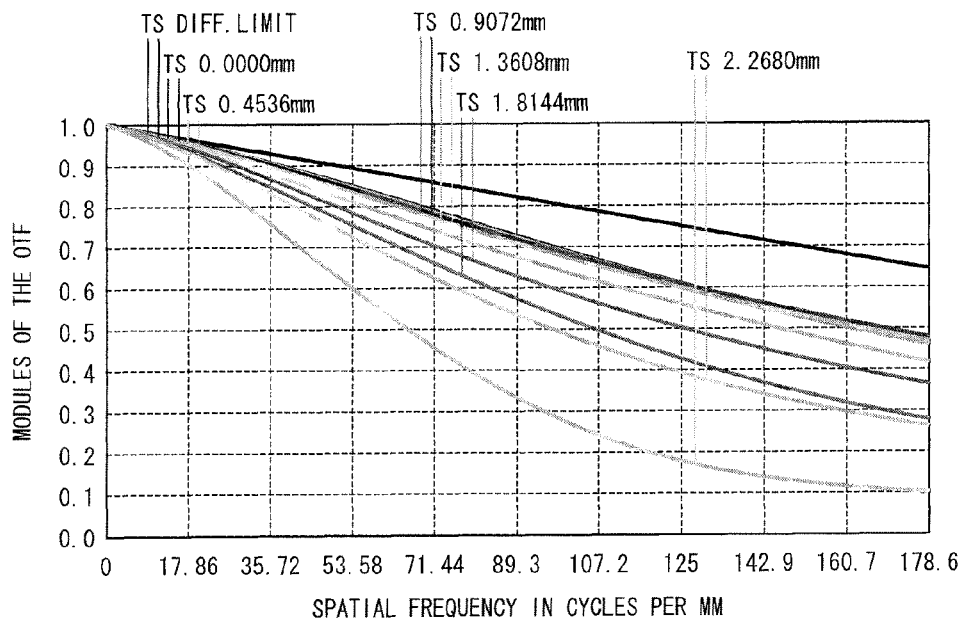
FIG. 12 is a graph illustrating an MTF-spatial frequency characteristic of the image sensing lens of FIG. 2.

FIG. 12 is a graph illustrating a relation observed in the image sensing lens 200 between (i) MTF (unit: not applicable) shown on a vertical axis, and (ii) a spatial frequency (unit: 1 p/mm) shown on a horizontal axis.

Figure 13:
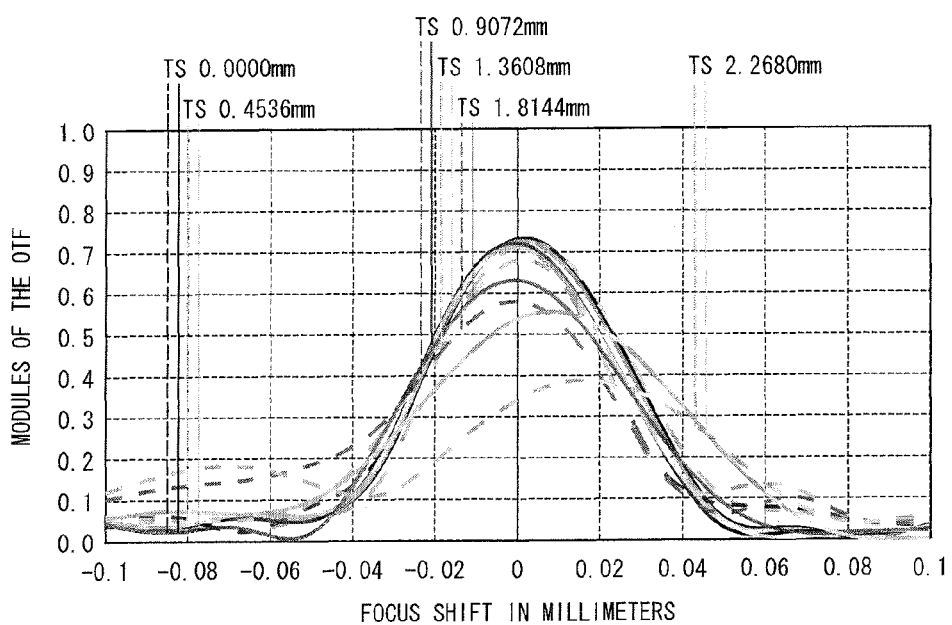
FIG. 13 is a graph illustrating defocus MTF of the image sensing lens of FIG. 2.

FIG. 13 is a graph illustrating defocus MTF of the image sensing lens 200, that is, a relation observed in the image sensing lens 200 between (i) MTF shown on a vertical axis, and (ii) a focus shift location (unit: mm) shown on a horizontal axis.

Figure 14:
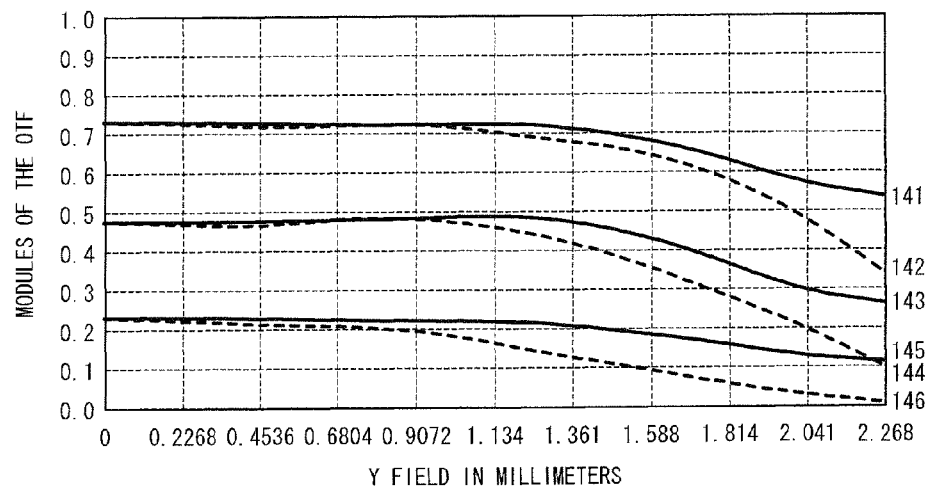
FIG. 14 is a graph illustrating an MTF-image height characteristic of the image sensing lens of FIG. 2.

FIG. 14 is a graph illustrating a relation observed in the image sensing lens 200 between (i) MTF shown on a vertical axis and (ii) an image height (unit: mm) shown on a horizontal axis.

Figure 15:
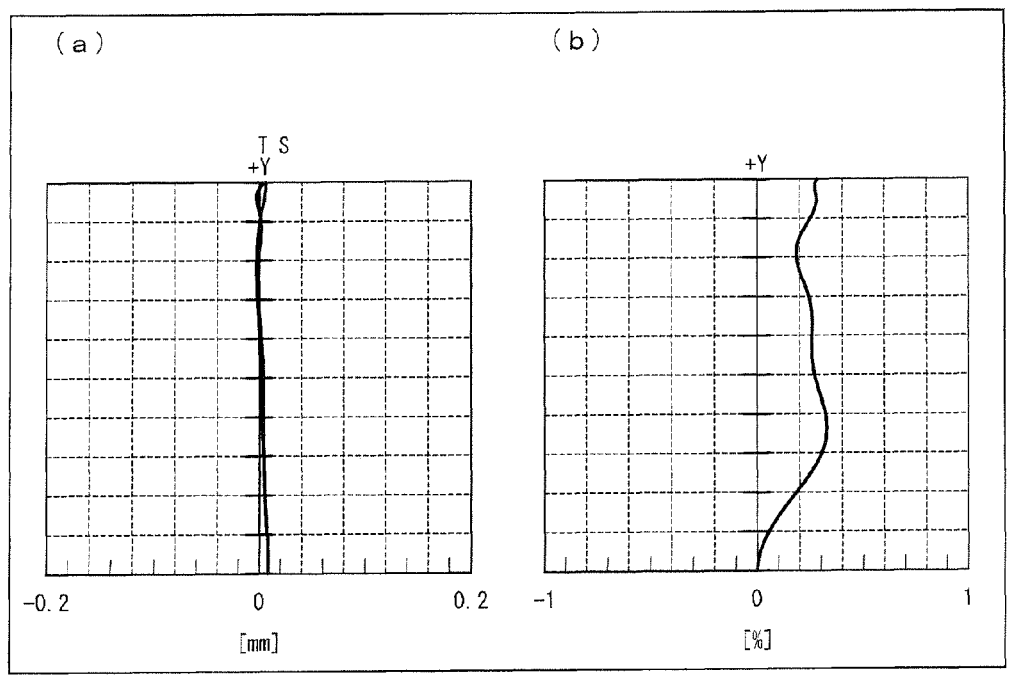
FIG. 15 shows graphs illustrating aberration characteristics of the image sensing lens of FIG. 2, where (a) shows an astigmatism characteristic, and (b) shows a distortion characteristic.

FIG. 15 shows graphs illustrating aberration characteristics of the image sensing lens 200, where (a) shows an astigmatism characteristic and (b) shows a distortion characteristic.

Figure 16:
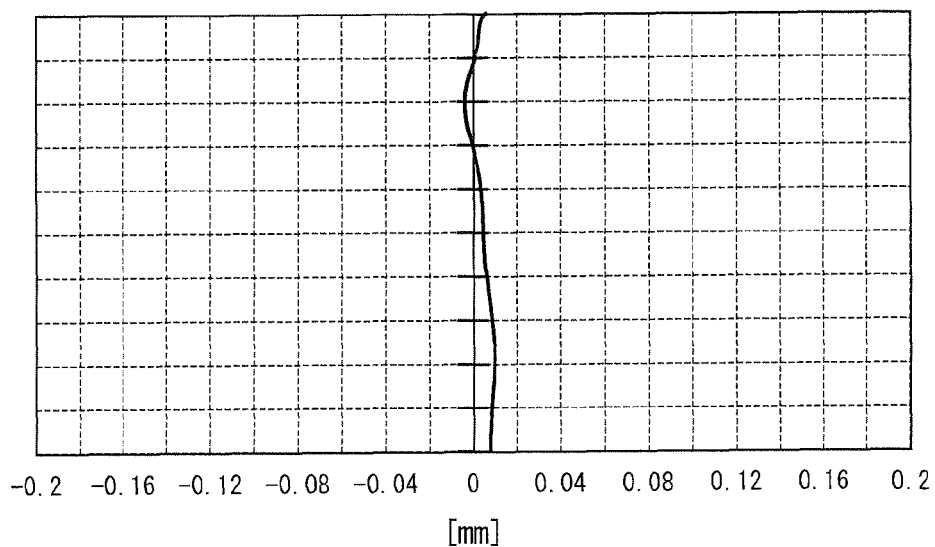
FIG. 16 is a graph illustrating a spherical aberration characteristic of the image sensing lens of FIG. 2.

FIG. 16 is a graph illustrating a spherical aberration characteristic of the image sensing lens 200.

Figure 17:
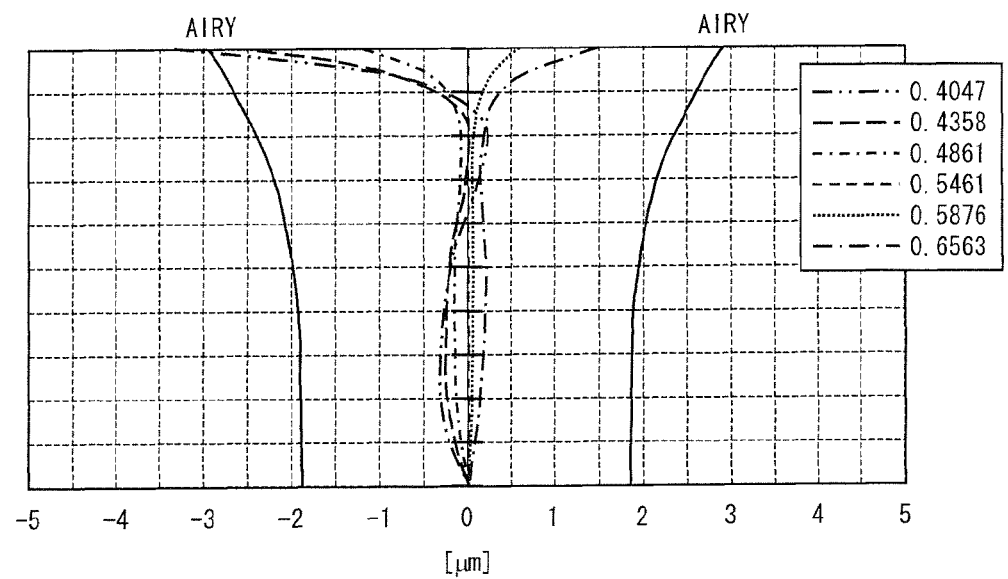
FIG. 17 is a graph illustrating a chromatic aberration characteristic of the image sensing lens of FIG. 2.

FIG. 17 is a graph illustrating a chromatic aberration characteristic of the image sensing lens 200.

Figure 18:
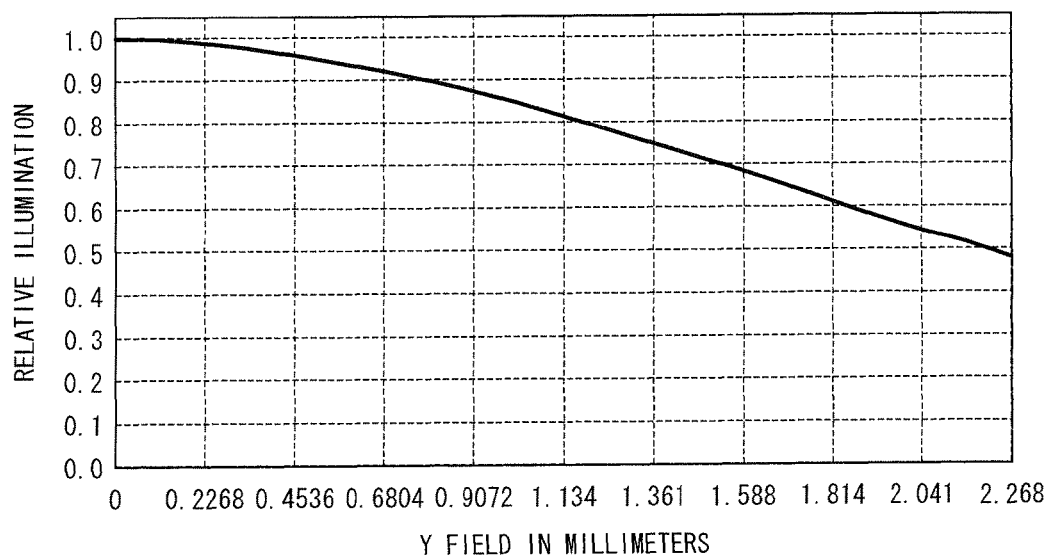
FIG. 18 is a graph illustrating a relative illumination characteristic of the image sensing lens of FIG. 2.

FIG. 18 is a graph illustrating a relative illumination characteristic of the image sensing lens 200.

As illustrated in FIG. 12, the image sensing lens 200 exhibits a slightly low MTF value for the tangential image surface at the image height h1.0 in a case where the spatial frequency band is as high as above 120 lp/mm. Other than this low MTF value, the image sensing lens 200 exhibits a high MTF characteristic of 0.2 or greater for both the tangential image surface and the sagittal image surface at any of the image heights h0 through h1.0. As compared to conventional image sensing lenses, the image sensing lens 200 thus forms an image of the object 3 with an overall resolving power which is good for every portion from the center of the image to the periphery thereof.

As illustrated in FIG. 13, the image sensing lens 200 exhibits, on the image surface S11 (see FIG. 2) corresponding to the focus shift location of 0 mm, a high MTF characteristic of 0.2 or greater for both the tangential image surface and the sagittal image surface at any of the image heights h0 through h1.0. The image sensing lens 200 thus forms an image of the object 3 with a resolving power which is good for every portion from the center of the image to the periphery thereof.

FIG. 14 shows a curve 144, which indicates MTF of the image sensing lens 200 for the tangential image surface at a spatial frequency corresponding to the Nyquist frequency/2. The curve 144 indicates that the MTF is slightly low at the image height h0.9 (2.041 mm) or greater. FIG. 14 shows a curve 145, which indicates MTF of the image sensing lens 200 for the sagittal image surface at a spatial frequency corresponding to the Nyquist frequency. The curve 145 indicates that the MTF is slightly low at the image height h0.6 (1.361 mm) or greater. FIG. 14 further shows a curve 146, which indicates MTF of the image sensing lens 200 for the tangential image surface at the spatial frequency corresponding to the Nyquist frequency. The curve 146 indicates that the MTF is slightly low at the image height h0.4 (0.9072 mm) or greater.

FIG. 14 shows (i) a curve 141, which indicates MTF of the image sensing lens 200 for the sagittal image surface at a spatial frequency corresponding to the Nyquist frequency/4 and (ii) a curve 142, which indicates MTF of the image sensing lens 200 for the tangential image surface at the same spatial frequency. The curves 141 and 142 indicate that the image sensing lens 200 exhibits a high MTF characteristic of 0.2 or greater at any of the image heights h0 to h1.0 (2.268 mm). FIG. 14 further shows a curve 143, which indicates MTF of the image sensing lens 200 for the sagittal image surface at the spatial frequency corresponding to the Nyquist frequency/2. The curve 143 similarly indicates that the image sensing lens 200 exhibits a high MTF characteristic of 0.2 or greater at any of the image heights h0 to h1.0 (2.268 mm). As compared to conventional image sensing lenses, the image sensing lens 200 thus forms an image of the object 3 with an overall resolving power which is good for every portion from the center of the image to the periphery thereof.

The respective graphs of (a) and (b) of FIG. 15 and FIGS. 16 and 17 each show (i) on a vertical axis, an image height and) on a horizontal axis, how light rays of different wavelengths are displaced in a direction normal to the optical axis La. The graph of FIG. 17 shows diffraction limits with two respective curves (indicated by reference code AIRY) on left and right sides.

The respective graphs of (a) and (b) of FIG. 15 and FIG. 16 show only small amounts of remaining aberrations (small difference in magnitude of each aberration in the direction normal to the optical axis La). This indicates that the image sensing lens 200 has good optical characteristics.

The graph of FIG. 17 indicates that chromatic aberration is corrected well even near the diffraction limits. This in turn indicates that the image sensing lens 200 has good optical characteristics.

The graph of FIG. 18 shows (i) on a horizontal axis, an image height and (ii) on a vertical axis, a proportion of a light amount for an image height relative to a light amount on the optical axis La (that is, the image height h0).

As in a general image sensing lens, the image sensing lens 200 has a relative illumination, that is, a light amount, which decreases toward the periphery of an image (that is, with a larger image height). However, the image sensing lens 200 exhibits, as the graph of FIG. 18 shows, no rapid decrease in light amount toward the periphery of an image, and thus maintains a high relative illumination even at the periphery of an image. This indicates that the image sensing lens 200 has a good relative illumination characteristic.

The image sensing lens 200 can be construed, among the other image sensing lenses 1, as designed to have (i) a wide angle of view, specifically a horizontal angle of view of approximately 55 degrees, (ii) small distortion, and (iii) slightly inferior optical characteristics for the periphery of an image.

[Optical Characteristics of Image Sensing Lens 300]

Figure 19:
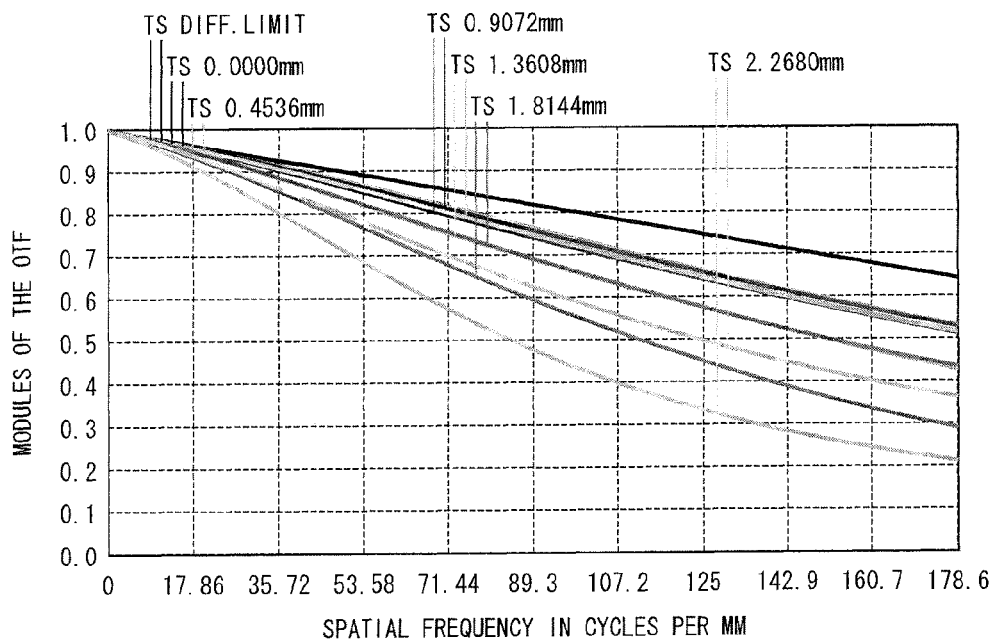
FIG. 19 is a graph illustrating an MTF-spatial frequency characteristic of the image sensing lens of FIG. 3.

FIG. 19 is a graph illustrating a relation observed in the image sensing lens 300 between (i) MTF (unit: not applicable) shown on a vertical axis, and (ii) a spatial frequency (unit: 1 p/mm) shown on a horizontal axis.

Figure 20:
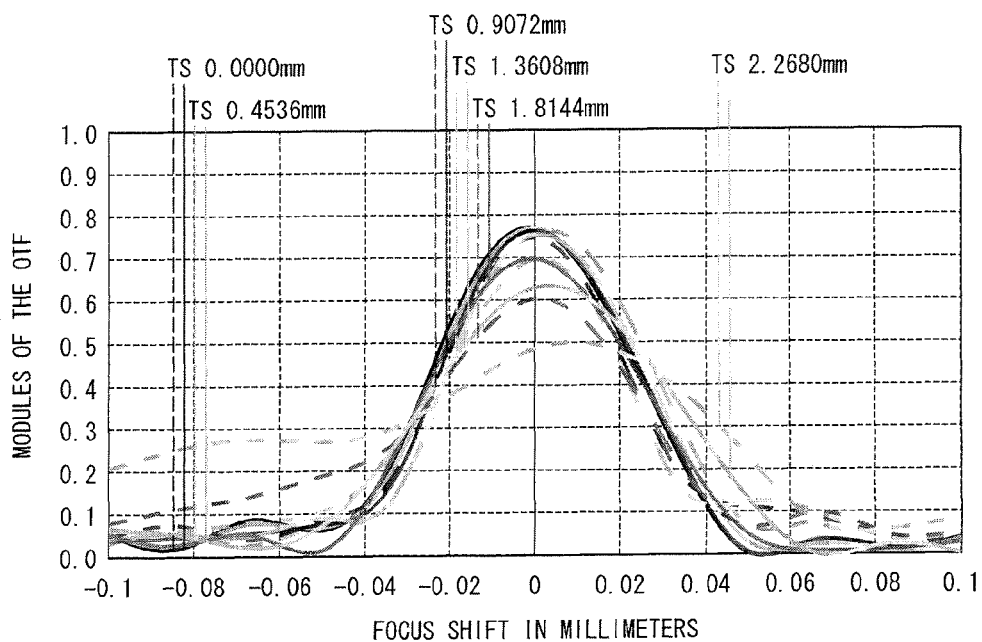
FIG. 20 is a graph illustrating defocus MTF of the image sensing lens of FIG. 3.

FIG. 20 is a graph illustrating defocus MTF of the image sensing lens 300, that is, a relation observed in the image sensing lens 300 between (i) MTF shown on a vertical axis and (ii) a focus shift location (unit: mm) shown on a horizontal axis.

Figure 21:
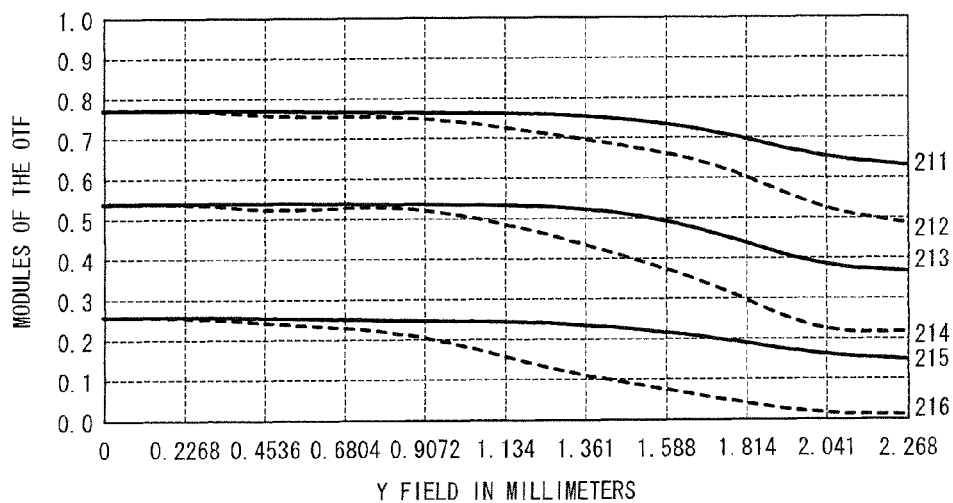
FIG. 21 is a graph illustrating an MTF-image height characteristic of the image sensing lens of FIG. 3.

FIG. 21 is a graph illustrating a relation observed in the image sensing lens 300 between (i) MTF shown on a vertical axis and (ii) an image height (unit: mm) shown on a horizontal axis.

Figure 22:
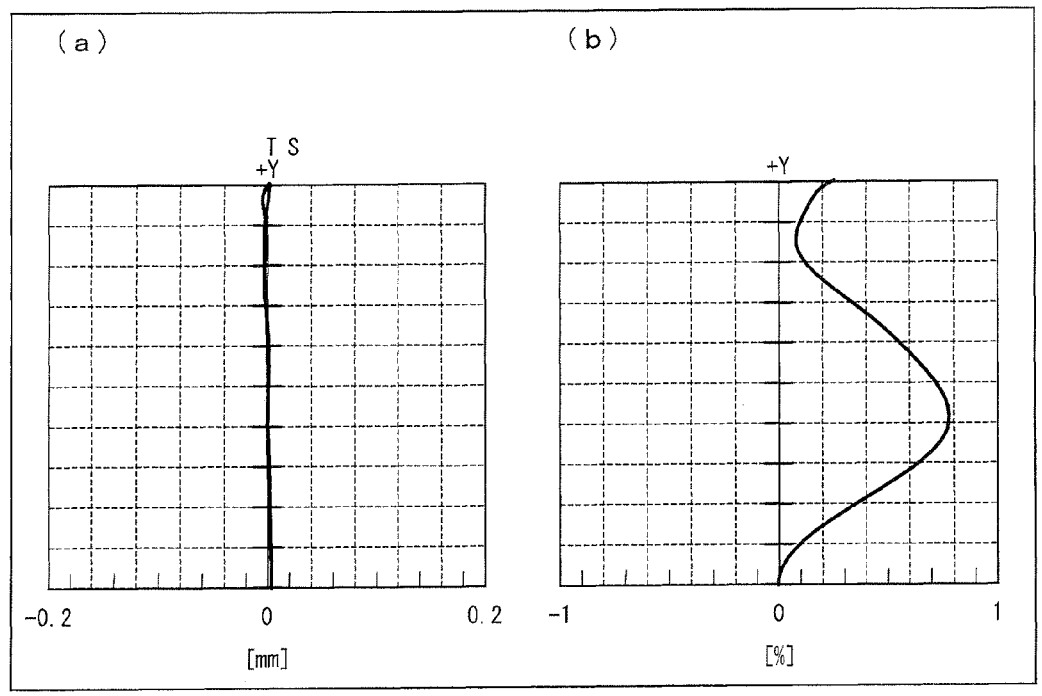
FIG. 22 shows graphs illustrating aberration characteristics of the image sensing lens of FIG. 3, where (a) shows an astigmatism characteristic, and (b) shows a distortion characteristic.

FIG. 22 shows graphs illustrating aberration characteristics of the image sensing lens 300, where (a) shows an astigmatism characteristic and (b) shows a distortion characteristic.

Figure 23:
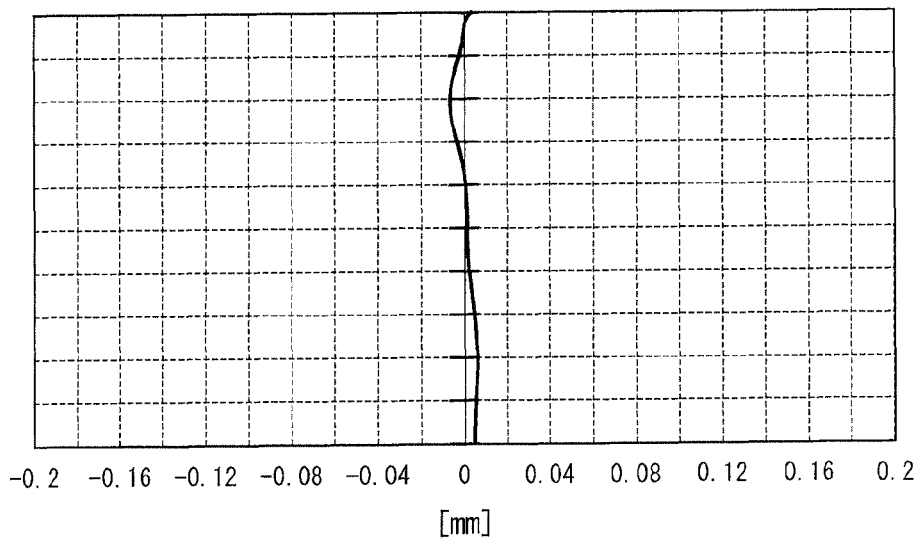
FIG. 23 is a graph illustrating a spherical aberration characteristic of the image sensing lens of FIG. 3.

FIG. 23 is a graph illustrating a spherical aberration characteristic of the image sensing lens 300.

Figure 24:
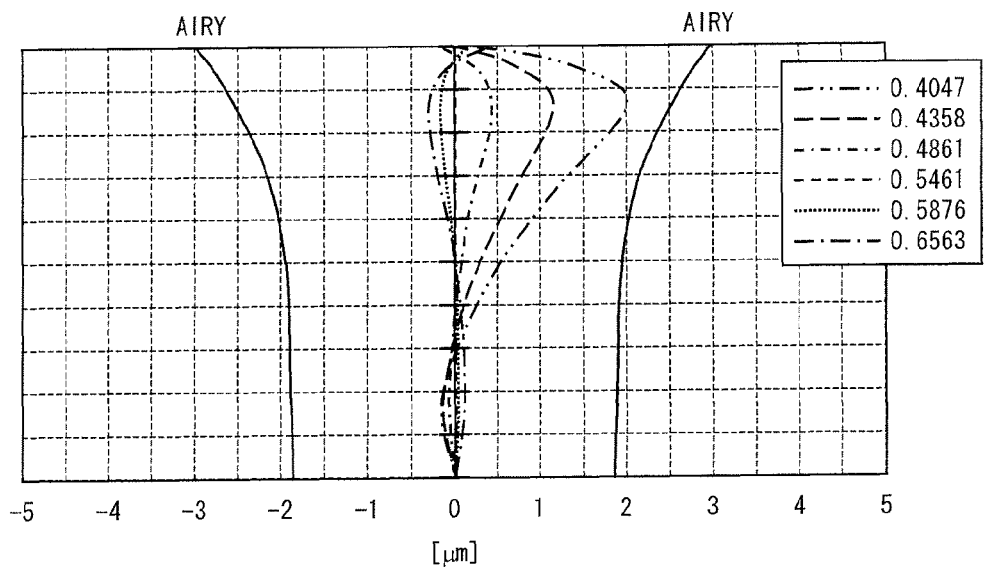
FIG. 24 is a graph illustrating a chromatic aberration characteristic of the image sensing lens of FIG. 3.

FIG. 24 is a graph illustrating a chromatic aberration characteristic of the image sensing lens 300.

Figure 25:
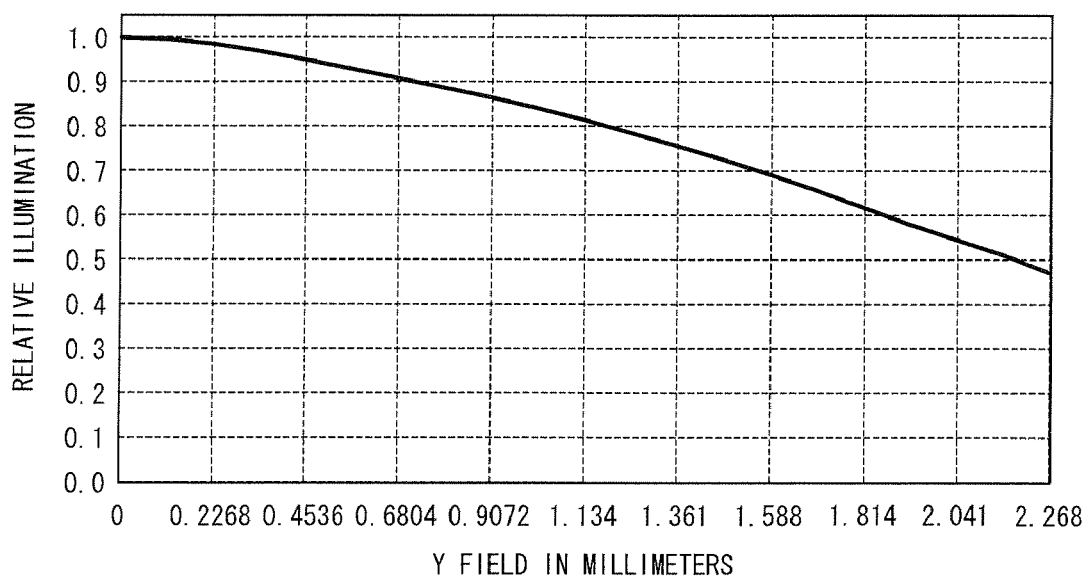
FIG. 25 is a graph illustrating a relative illumination characteristic of the image sensing lens of FIG. 3.

FIG. 25 is a graph illustrating a relative illumination characteristic of the image sensing lens 300.

As illustrated in FIG. 19, the image sensing lens 300 exhibits a high MTF characteristic of 0.2 or greater for both the tangential image surface and the sagittal image surface at any of the image heights h0 to h1.0. The image sensing lens 300 thus forms an image of the object 3 with an overall resolving power which is good for every portion from the center of the image to the periphery thereof.

As illustrated in FIG. 20, the image sensing lens 300 exhibits, on the image surface S11 (see FIG. 3) corresponding to a focus shift location of 0 mm, a high MTF characteristic of 0.2 or greater for both the tangential image surface and the sagittal image surface at any of the image heights h0 to h1.0. The image sensing lens 300 thus forms an image of the object 3 with an overall resolving power which is good for every portion from the center of the image to the periphery thereof.

FIG. 21 shows a curve 215, which indicates MTF of the image sensing lens 300 for the sagittal image surface at a spatial frequency corresponding to the Nyquist frequency. The curve 215 indicates that the MTF is slightly low at the image height h0.75 (1.701 mm) or greater. FIG. 21 further shows a curve 216, which indicates MTF of the image sensing lens 300 for the tangential image surface at the same spatial frequency. The curve 216 indicates that the MTF is slightly low at the image height h0.4 (0.9072 mm) or greater.

FIG. 21 shows (i) a curve 211, which indicates MTF of the image sensing lens 300 for the sagittal image surface at a spatial frequency corresponding to the Nyquist frequency/4 and (ii) a curve 212, which indicates MTF of the image sensing lens 300 for the tangential image surface at the same spatial frequency. The curves 211 and 212 indicate that the image sensing lens 300 exhibits a high MTF characteristic of 0.2 or greater at any of the image heights h0 to h1.0 (2.268 mm). FIG. 21 further shows (i) a curve 213, which indicates MTF of the image sensing lens 300 for the sagittal image surface at a spatial frequency corresponding to the Nyquist frequency/2 and (ii) a curve 214, which indicates MTF of the image sensing lens 300 for the tangential image surface at the same spatial frequency. The curves 213 and 214 similarly indicate that the image sensing lens 300 exhibits a high MTF characteristic of 0.2 or greater at any of the image heights h0 to h1.0 (2.268 mm). As compared to conventional image sensing lenses, the image sensing lens 300 thus forms an image of the object 3 with an overall resolving power which is good for every portion from the center of the image to the periphery thereof.

The respective graphs of (a) and (b) of FIG. 22 and FIGS. 23 and 24 each show (i) on a vertical axis, an image height and (ii) on a horizontal axis, how light rays of different wavelengths are displaced in a direction normal to the optical axis La. The graph of FIG. 24 shows diffraction limits with two respective curves (indicated by reference code AIRY) on left and right sides.

The respective graphs of (a) and (b) of FIG. 22 and FIG. 23 show only small amounts of remaining aberrations (small difference in magnitude of each aberration in the direction normal to the optical axis La). This indicates that the image sensing lens 300 has good optical characteristics. The distortion of (b) of FIG. 22 for the image sensing lens 300 is slightly greater than that of (b) of FIG. 15 for the image sensing lens 200. However, the distortion of (b) of FIG. 22 is not crucially greater for the image sensing lens 300.

The graph of FIG. 24 indicates that chromatic aberration is corrected well even near the diffraction limits. This in turn indicates that the image sensing lens 300 has good optical characteristics.

The graph of FIG. 25 shows (i) on a horizontal axis, an image height and (ii) on a vertical axis, a proportion of a light amount for an image height relative to a light amount on the optical axis La (that is, the image height h0).

As in a general image sensing lens, the image sensing lens 300 has a relative illumination, that is, a light amount, which decreases toward the periphery of an image (that is, with a larger image height). However, the image sensing lens 300 exhibits, as the graph of FIG. 25 shows, no rapid decrease in light amount toward the periphery of an image, and thus maintains a high relative illumination even at the periphery of an image. This indicates that the image sensing lens 300 has a good relative illumination characteristic.

The image sensing lens 300 can be construed, among the other image sensing lenses 1, as designed to have (i) a wide angle of view, specifically a horizontal angle of view of approximately 55 degrees, (ii) slightly large distortion, and (iii) superior optical characteristics for the periphery of an image.

Each of the image sensing lenses 200 and 300 has an H (horizontal) angle of view of approximately 55 degrees, which is wider than the H (horizontal) angle of view of the image sensing lens 100 (approximately 52 degrees).

The image sensing lenses 200 and 300 having the above respective arrangements are compared as follows in terms of optical characteristics: The image sensing lens 200 exhibits a distortion (see (b) of FIG. 15) smaller than the distortion of the sensing lens 300 (see (b) of FIG. 22), and is thus superior in distortion characteristic. In contrast, the image sensing lens 200 exhibits optical characteristics (see, for example, FIG. 13) for the vicinity of the image height h1.0 which are inferior to those of the image sensing lens 300 (see, for example, FIG. 20).

[Optical Characteristics of Image Sensing Lens 400]

Figure 26:
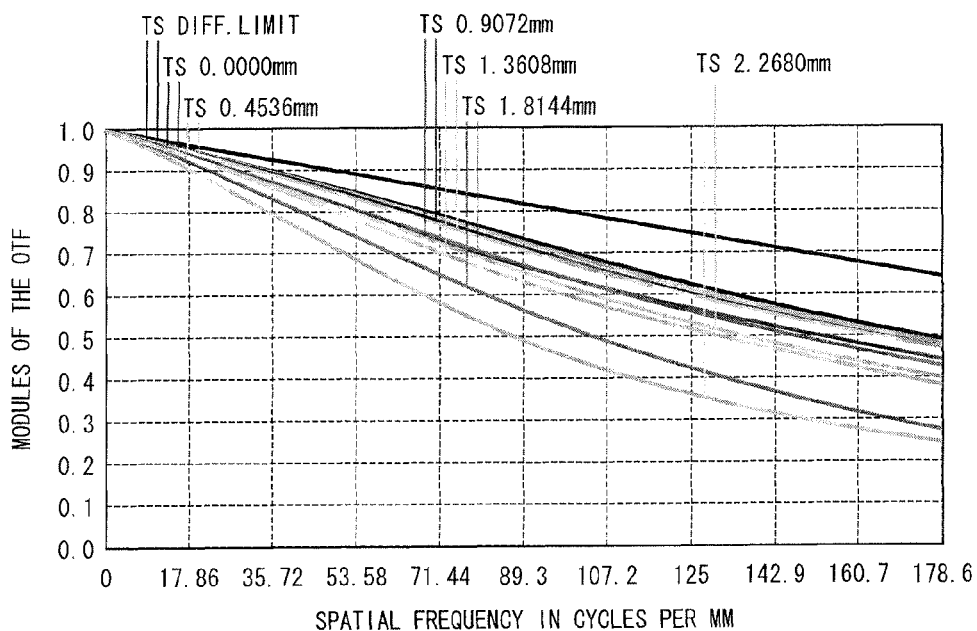
FIG. 26 is a graph illustrating an MTF-spatial frequency characteristic of the image sensing lens of FIG. 4.

FIG. 26 is a graph illustrating a relation observed in the image sensing lens 400 between (i) MTF (unit: not applicable) shown on a vertical axis, and (ii) a spatial frequency (unit: 1 p/mm) shown on a horizontal axis.

Figure 27:
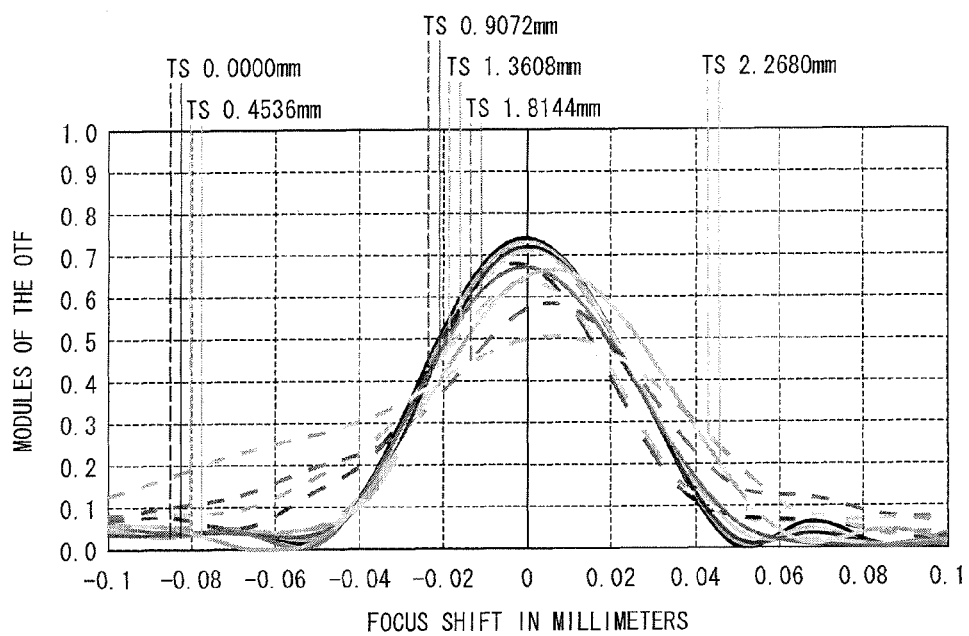
FIG. 27 is a graph illustrating defocus MTF of the image sensing lens of FIG. 4.

FIG. 27 is a graph illustrating defocus MTF of the image sensing lens 400, that is, a relation observed in the image sensing lens 400 between (i) MTF shown on a vertical axis and (ii) a focus shift location (unit: mm) shown on a horizontal axis.

Figure 28:
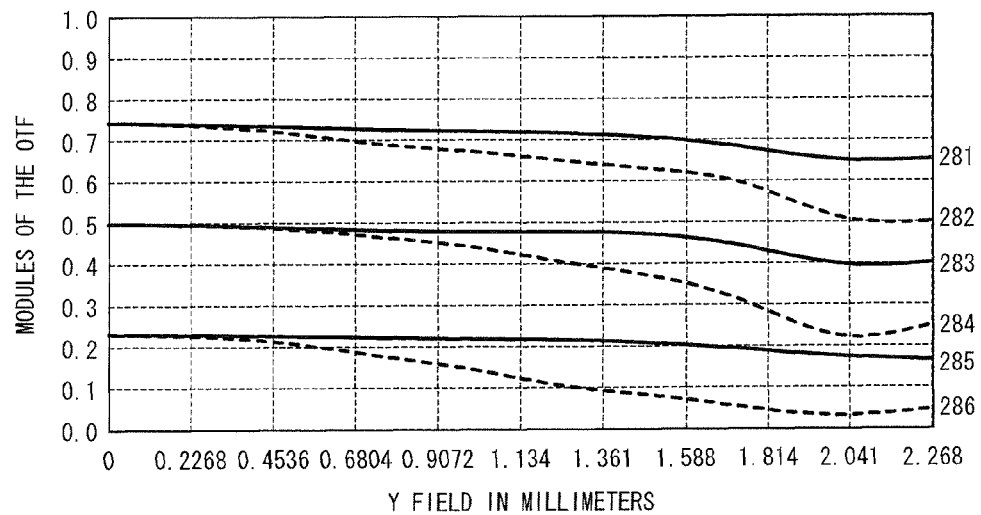
FIG. 28 is a graph illustrating an MTF-image height characteristic of the image sensing lens of FIG. 4.

FIG. 28 is a graph illustrating a relation observed in the image sensing lens 400 between (i) MTF shown on a vertical axis and (ii) an image height (unit: mm) shown on a horizontal axis.

Figure 29:
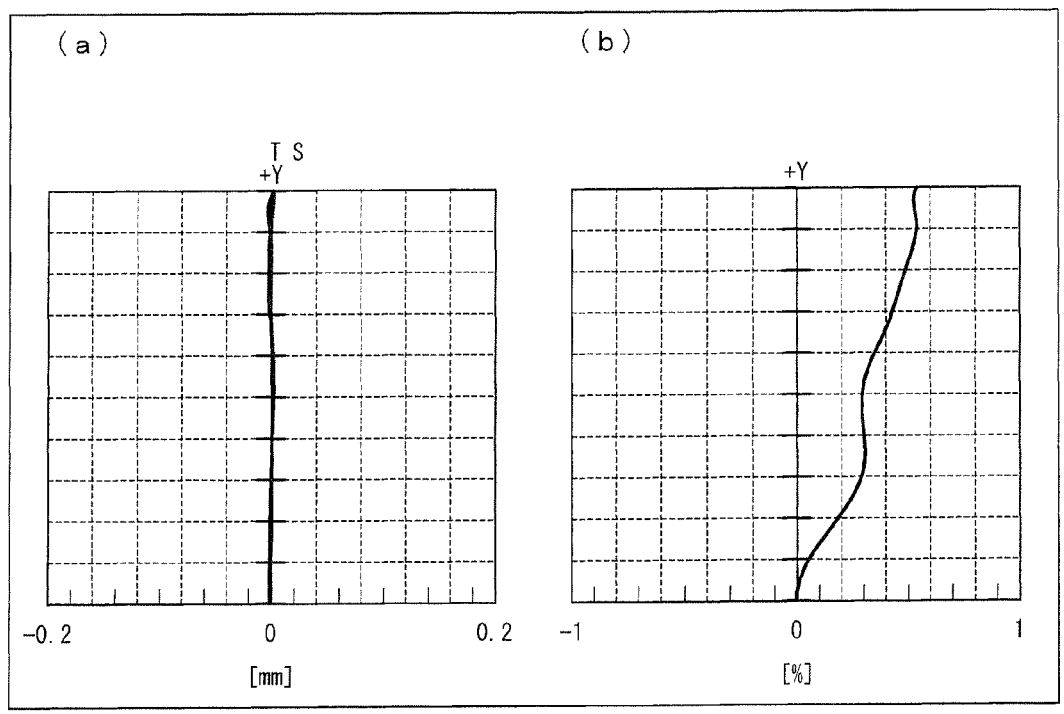
FIG. 29 shows graphs illustrating aberration characteristics of the image sensing lens of FIG. 4, where (a) shows an astigmatism characteristic, and (b) shows a distortion characteristic.

FIG. 29 shows graphs illustrating aberration characteristics of the image sensing lens 400, where (a) shows an astigmatism characteristic and (b) shows a distortion characteristic.

Figure 30:
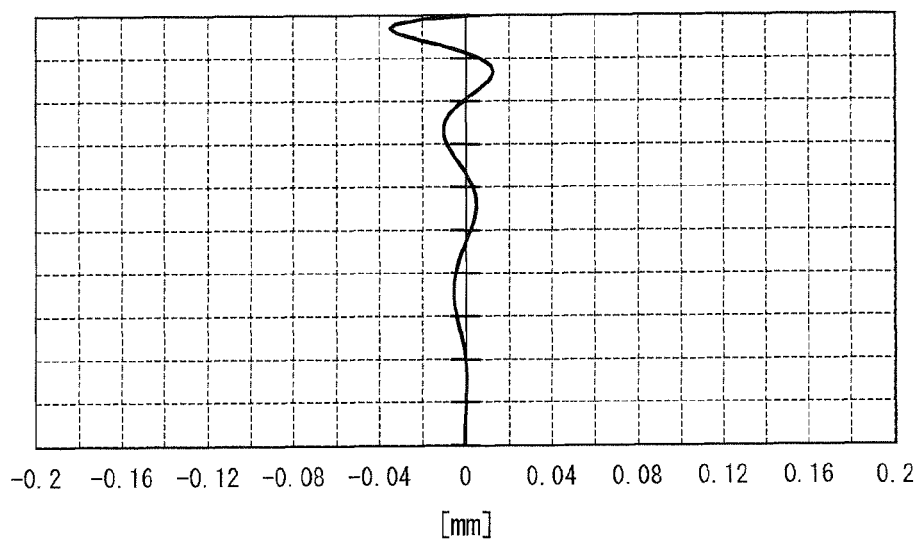
FIG. 30 is a graph illustrating a spherical aberration characteristic of the image sensing lens of FIG. 4.

FIG. 30 is a graph illustrating a spherical aberration characteristic of the image sensing lens 400.

Figure 31:
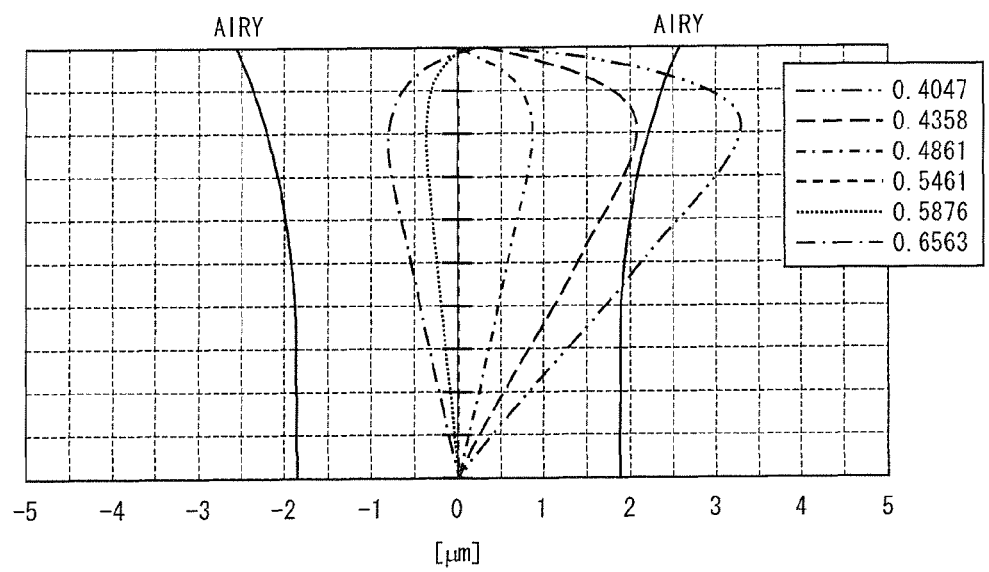
FIG. 31 is a graph illustrating a chromatic aberration characteristic of the image sensing lens of FIG. 4.

FIG. 31 is a graph illustrating a chromatic aberration characteristic of the image sensing lens 400.

Figure 32:
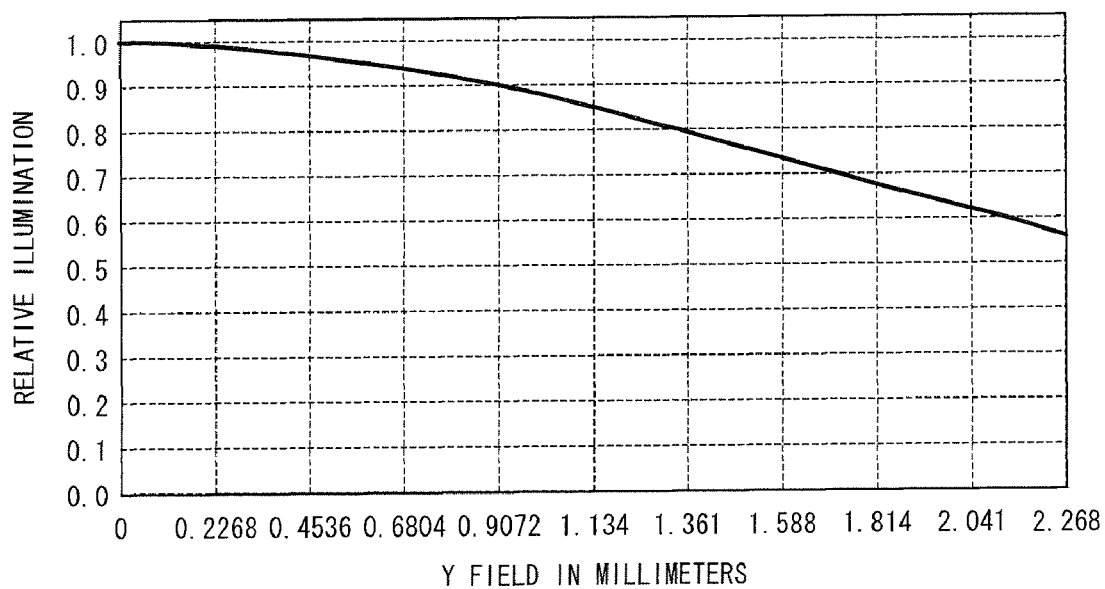
FIG. 32 is a graph illustrating a relative illumination characteristic of the image sensing lens of FIG. 4.

FIG. 32 is a graph illustrating a relative illumination characteristic of the image sensing lens 400.

As illustrated in FIG. 26, the image sensing lens 400 exhibits a high MTF characteristic of 0.2 or greater for both the tangential image surface and the sagittal image surface at any of the image heights h0 to h1.0. The image sensing lens 400 thus forms an image of the object 3 with an overall resolving power which is good for every portion from the center of the image to the periphery thereof.

As illustrated in FIG. 27, the image sensing lens 400 exhibits, on the image surface S11 (see FIG. 4) corresponding to a focus shift location of 0 mm, a high MTF characteristic of 0.2 or greater for both the tangential image surface and the sagittal image surface at any of the image heights h0 to h1.0. The image sensing lens 400 thus forms an image of the object 3 with an overall resolving power which is good for every portion from the center of the image to the periphery thereof.

FIG. 28 shows a curve 285, which indicates MTF of the image sensing lens 400 for the sagittal image surface at a spatial frequency corresponding to the Nyquist frequency. The curve 285 indicates that the MTF is slightly low at the image height h0.7 (1.588 mm) or greater. FIG. 7 further shows a curve 286, which indicates MTF of the image sensing lens 400 for the tangential image surface at the same spatial frequency. The curve 286 indicates that the MTF is slightly low at the image height h0.25 (0.5670 mm) or greater.

FIG. 28 shows (i) a curve 281, which indicates MTF of the image sensing lens 400 for the sagittal image surface at a spatial frequency corresponding to the Nyquist frequency/4 and (ii) a curve 282, which indicates MTF of the image sensing lens 400 for the tangential image surface at the same spatial frequency. The curves 281 and 282 indicate that the image sensing lens 400 exhibits a high MTF characteristic of 0.2 or greater at any of the image heights h0 to h1.0 (2.268 mm). FIG. 28 further shows (i) a curve 283, which indicates MTF of the image sensing lens 400 for the sagittal image surface at a spatial frequency corresponding to the Nyquist frequency/2 and (ii) a curve 284, which indicates MTF of the image sensing lens 400 for the tangential image surface at the same spatial frequency. The curves 283 and 284 similarly indicate that the image sensing lens 400 exhibits a high MTF characteristic of 0.2 or greater at any of the image heights h0 to h1.0 (2.268 mm). As compared to conventional image sensing lenses, the image sensing lens 400 thus forms an image of the object 3 with an overall resolving power which is good for every portion from the center of the image to the periphery thereof.

The respective graphs of (a) and (b) of FIG. 29 and FIGS. 30 and 31 each show (i) on a vertical axis, an image height and (ii) on a horizontal axis, how light rays of different wavelengths are displaced in a direction normal to the optical axis La. The graph of FIG. 31 shows diffraction limits with two respective curves (indicated by reference code AIRY) on left and right sides.

The respective graphs of (a) and (b) of FIG. 29 and FIG. 30 show only small amounts of remaining aberrations (small difference in magnitude of each aberration in the direction normal to the optical axis La). This indicates that the image sensing lens 400 has good optical characteristics.

The graph of FIG. 31 indicates that the chromatic aberration characteristic of the image sensing lens 400 is impaired near the diffraction limits.

The graph of FIG. 32 shows (i) on a horizontal axis, an image height and (ii) on a vertical axis, a proportion of a light amount for an image height relative to a light amount on the optical axis La (that is, the image height h0).

As in a general image sensing lens, the image sensing lens 400 has a relative illumination, that is, a light amount, which decreases toward the periphery of an image (that is, with a larger image height). However, the image sensing lens 400 exhibits, as the graph of FIG. 32 shows, no rapid decrease in light amount toward the periphery of an image, and thus maintains a high relative illumination even at the periphery of an image. This indicates that the image sensing lens 400 has a good relative illumination characteristic.

The image sensing lens 400 can be construed, among the other image sensing lenses 1, as designed to have a narrow angle of view, specifically a horizontal angle of view of approximately 48 degrees.

[Design Data of Each Image Sensing Lens 1]

FIG. 33 is a table showing design data of the image sensing lens 100.

FIG. 34 is a table showing design data of the image sensing lens 200.

FIG. 35 is a table showing design data of the image sensing lens 300.

FIG. 36 is a table showing design data of the image sensing lens 400.

FIG. 37 is a table showing example specifications of image sensing modules each including (i) one of the image sensing lenses 100, 200, 300, and 400 and (ii) a sensor (solid-state image sensing device) placed at the image surface S11.

FIG. 38 is a table showing respective values of f1/f, f2/f, f3/f, f4/f, and v1−v2 for each of the image sensing lenses 100, 200, 300, and 400.

FIG. 39 is a table showing, for each of the image sensing lenses 100, 200, 300, and 400, respective values of (i) the focal length f1 of the first lens L1, (ii) the focal length f2 of the second lens L2, (iii) the focal length f3 of the third lens L3, and (iv) the focal length f4 of the fourth lens L4.

It is assumed that the data shown in FIGS. 33 through 37 has been measured with use of a ¼-inch, 5M-class sensor having a pixel size (pixel pitch) of 1.4 µm, a D (diagonal) size of 4.536 mm, an H (horizontal) size of 3.629 mm, and a V (vertical) size of 2.722 mm.

To obtain the data shown in FIGS. 37 and 38, it is assumed that an object distance is an infinite distance and that a source of white light according to weighting below (that is, white light made up of different wavelengths mixed at proportions adjusted as below) has been used as a simulation light source (not shown).

404.66 nm=0.13
435.84 nm=0.49
486.1327 nm=1.57
546.07 nm=3.12
587.5618 nm=3.18
656.2725 nm=1.51

Under item "Element" in FIGS. 33 through 36, "L1" indicates that a corresponding row presents design data of the first lens L1; "L2" indicates that a corresponding row presents design data of the second lens L2; "L3" indicates that a corresponding row presents design data of the third lens L3; "L4" indicates that a corresponding row presents design data of the fourth lens L4; "CG" indicates that a corresponding row presents design data of the cover glass CG; and "Sensor" indicates that a corresponding row presents design data of the above sensor provided at the image surface S11.

Under item "Material" in FIGS. 33 through 36, "Nd" indicates that a corresponding column presents a refractive index of each of the first, second, third, and fourth lenses L1, L2, L3, and L4 and the cover glass CG for the d rays (wavelength: 587.6 nm). Under item "Material" in FIGS. 33 through 36, "vd" indicates that a corresponding column presents an Abbe number of each of the first, second, third, and fourth lenses L1, L2, L3, and L4 and the cover glass CG for the d rays. As is clear from the data under this item, the Abbe number of the first lens L1 minus the Abbe number of the second lens L2 (v1−v2; 56−26) for each of the image sensing lenses 100, 200, 300, and 400 is 30, which is desirably greater than 20.

Under item "Surface" in FIGS. 33 through 36, "S1" through "S11" (i) respectively correspond to the surfaces S1 through S10 and the image surface S11, and (ii) indicate that their respective rows present design data of the respective surfaces.

Item "Curvature" in FIGS. 33 through 36 shows a curvature of each of the surfaces S1 through S10 and the image surface S11.

Item "Center thickness" in FIGS. 33 through 36 shows a distance, along the optical axis La (corresponding to the Z direction in FIGS. 1 through 4), between (i) a center of one of two surfaces corresponding to each other and (ii) a center of the other surface present toward the image surface S11 side.

Item "Effective radius" in FIGS. 33 through 36 shows an effective radius of each of the surfaces S1 through S8, that is, a radius of a circular region within which a range of a luminous flux can be controlled.

Item "Aspheric coefficient" in FIGS. 33 through 36 shows, for each of the surfaces S1 through S10 and the image surface S11, an i-th order aspheric coefficient Ai (where i is an even number of 4 or greater) in Aspheric Formula (6) for an aspheric surface. In Aspheric Formula (6), Z is a coordinate in the optical axis direction (that is, the Z direction in FIG. 1); x is a coordinate in the direction normal to the optical axis (that is, the X direction in FIG. 1); R is a radius of curvature (reciprocal of the curvature); and K is a conic coefficient.

$$Z = \frac{x^2 \times 1/R}{1 + \sqrt{1 - (1+K) \times x^2 \times 1/R^2}} + \sum_{\substack{i=4 \\ (even\ number)}} A_i \times x^i \quad (6)$$

In each of FIGS. 33 through 36, each value expressed as "(constant a) E (constant b)" means "(constant a) multiplied by 10 to the power of (constant b)". For example, "7.18E-01" means "$7.18 \times 10^{-1}$" or "0.718" in standard form.

As shown by Item "Aspheric coefficient" in FIGS. 33 through 36, each of the first, second, third, and fourth lenses L1, L2, L3, and L4 of the present embodiment is assigned a predetermined aspheric coefficient for each of its two surfaces. This indicates that the surfaces S1 through S8 are all aspheric. The image sensing lens 1, including the first, second, third, and fourth lenses L1, L2, L3, and L4, each of which has surfaces that are both aspheric, is desirably arranged in that it is easy to correct aberrations.

To correct aberrations better as such, at least the surfaces S6 through S8 of the image sensing lens 1 need to be aspheric. Further, the surfaces S1, S2, S4, and S5, and/or the surface S3 are preferably aspheric.

As shown in FIG. 37, each of the image sensing lenses 100, 200, 300, and 400 has an F number of 2.80, which is less than 3.5, and thus has a great resolving power.

Item "Focal length f" in FIG. 37 shows a focal length f of each of the image sensing lenses 100, 200, 300, and 400 (for the entire lens system) in units of mm.

Item "Angle of view" in FIG. 37 shows in units of degrees) (°) an angle of view of each of the image sensing lenses 100, 200, 300, and 400, that is, an angle within which each image sensing lens 1 can form an image. Item "Angle of view" shows the angle of view by three-dimensional parameters of D (diagonal), H (horizontal), and V (vertical).

Item "Relative illumination" in FIG. 37 numerically specifies respective relative illuminations of the image sensing lenses 100, 200, 300, and 400 shown in FIGS. 11, 18, 25, and 32, respectively, for the image heights h0.6, h0.8, and h1.0. That is, "Relative illumination" indicates a ratio of (i) a light amount for each of the image heights h0.6, h0.8, and h1.0 to (ii) a light amount for the image height h0). Each image sensing lens 1 obtains, for the image height h1.0, a light amount as large as approximately 50% of the light amount obtained for the image height h0.

Item "Chief ray angle" in FIG. 37 indicates a chief ray angle (CRA) of each of the image sensing lenses 100, 200, 300, and 400 for each of the image heights h0.6, h0.8, and h1.0.

Item "Overall optical length" in FIG. 37 shows a distance, within each of the image sensing lenses 100, 200, 300, and 400, from (i) a location at which the aperture stop 2 narrows light to (ii) the image surface S11. In other words, the overall optical length of each image sensing lens 1 refers to a total dimension, along the optical axis direction, of all constituent members each of which influences the optical characteristics of the image sensing lens 1.

Item "CG thickness" in FIG. 37 shows a thickness of the cover glass CG in the optical axis direction for each of the image sensing lenses 100, 200, 300, and 400.

As is clear from FIG. 38, each image sensing lens 1, namely the image sensing lenses 100, 200, 300, and 400, is arranged to satisfy all of Formulae (1) through (5) above.

In FIG. 39, "L1(f1)" indicates that a corresponding row presents the focal length f1 of the first lens L1 for each image sensing lens 1; "L2(f2)" indicates that a corresponding row presents the focal length f2 of the second lens L2 for each image sensing lens 1; "L3(f3)" indicates that a corresponding row presents the focal length f3 of the third lens L3 for each image sensing lens 1; and "L4(f4)" indicates that a corresponding row presents the focal length f4 of the fourth lens L4 for each image sensing lens 1.

[Image Sensing Module]

An image sensing module of the present embodiment includes: an image sensing lens 1; and a solid-state image sensing device for receiving, as light signals, light of an image formed by the image sensing lens 1. The solid-state image sensing device is provided at the image surface S11 (see FIGS. 1 through 4) of the image sensing lens 1, and is a CCD image sensor or a CMOS image sensor, for example.

The image sensing module achieves effects similar to those achieved by the image sensing lens 1, and thus allows production of a compact camera module having a great resolving power.

The solid-state image sensing device of the image sensing module preferably has a number of pixels which is not smaller than 3 megapixels. With the arrangement, it is possible to produce an image sensing module which makes full use of the great resolving power of the image sensing lens 1. The solid-state image sensing device of the image sensing module particularly preferably has a number of pixels of 5 megapixels.

The solid-state image sensing device of the image sensing module preferably has a pixel size which is smaller than 2.5 μm. With the arrangement, it is possible to produce an image sensing module which makes full use of the great resolving power of the image sensing lens 1. The solid-state image sensing device of the image sensing module particularly preferably has a pixel size of 1.4 μm.

Techniques related to the image sensing module are applicable not only to conventional image sensing modules, but also to image sensing modules which can be produced by a wafer-level lens process.

The wafer-level lens process is a process by which image sensing modules are produced as follows: First, a molding material such as resin is molded or shaped with use of, for example, an array mold so that a plurality of first lenses L1 are formed over a single surface of the molding material. This produces a first lens array including such a plurality of first lenses L1. Operations similar to the above are carried out so as to produce a second lens array including a plurality of second lenses L2, a third lens array including a plurality of third lenses L3, and a fourth lens array including a plurality of fourth lenses L4. A sensor array is also produced which includes a plurality of sensors over a single surface thereof. Next, the first, second, third, and fourth lens arrays are combined with one another, and the sensor array is mounted to the combination via, where necessary, a cover glass CG so that the individual first lenses L1, second lenses L2, third lenses L3, fourth lenses L4, and sensors face one another in a one-to-one correspondence. Then, aperture stops 2 are attached to the above combination. The resulting combination is divided into units each including an aperture stop 2, a first lens L1, a second lens L2, a third lens L3, a fourth lens L4, and a sensor which all face one another. According to this production process, it is possible to (i) produce a large number of image sensing modules simultaneously and rapidly, and consequently (ii) reduce a cost of producing image sensing modules.

The image sensing lens of the present embodiment may be arranged such that the first lens having (i) an object-side surface facing the object and (ii) an image-side surface facing the image surface, the object-side surface and the image-side surface being each an aspheric surface; the image-side surface of the second lens being an aspheric surface; and the third lens having an object-side surface facing the object, the object-side surface being an aspheric surface.

The image sensing lens of the present embodiment may be arranged such that the second lens having an object-side surface facing the object, the object-side surface being an aspheric surface.

According to the above arrangement, (i) both surfaces of the first lens, (ii) the surface of the second lens which surface faces the image surface, and (iii) the surface of the third lens which surface faces the object are all aspheric. With the arrangement, it is possible to easily correct aberrations better. Similarly, according to the above arrangement, the surface of the second lens which surface faces the object is aspheric. With the arrangement, it is possible to easily correct aberrations better.

The image sensing lens of the present embodiment may be arranged such that the image sensing lens satisfies Formulae (4) and (5) below, $$0.91 < f3/f < 1.89 \quad (4)$$

$$-0.9 < f4/f < -0.49 \quad (5),$$

where f3 is a focal length of the third lens; and f4 is a focal length of the fourth lens.

The image sensing lens having the above arrangement and satisfying Formulae (4) and (5) is more effective in correcting aberrations which occur outside the optical axis of the image sensing lens. In particular, it is possible to correct distortion and curvature of field better.

The image sensing lens of the present embodiment may be arranged such that each of the first lens, the second lens, the third lens, and the fourth lens is made of plastic.

With the above arrangement, it is possible to produce an image sensing lens at a reduced production cost. Generally, it is possible to select a material having a smaller chromatic dispersion in a case where a glass lens is used than in a case where a plastic lens is used as each of the above lenses. The use of a glass lens is, on the other hand, disadvantageous in that a glass lens requires a higher production cost due to a glass material and a process applied. The image sensing lens having the above arrangement is such that the combination of the first and second lenses achieves a sufficient achromatic effect. As such, even in a case where each of the lenses is made of plastic, it is possible to produce an image sensing lens in which chromatic aberration is corrected well.

The image sensing lens of the present embodiment may be arranged such that the image sensing lens has an F number of less than 3.5.

According to the above arrangement, the image sensing lens has an F number of smaller than 3.5. As such, it is possible to (i) increase an amount of received light and (ii) correct chromatic aberration well. Thus, it is possible to achieve a great resolving power. The image sensing lens of the present invention particularly preferably has an F number of 2.8.

The image sensing module of the present embodiment may be arranged such that the solid-state image sensing device has a number of pixels which number is not smaller than 3 megapixels.

With the above arrangement, it is possible to produce an image sensing module which makes full use of the great resolving power of the image sensing lens. The solid-state image sensing device included in the image sensing module of the present invention particularly preferably has a number of pixels of 5 megapixels.

The image sensing module of the present embodiment may be arranged such that the solid-state image sensing device has a pixel size which is smaller than 2.5 μm.

With the above arrangement, it is possible to produce an image sensing module which makes full use of the great resolving power of the image sensing lens. The solid-state image sensing device included in the image sensing module of the present invention particularly preferably has a pixels size of 1.4 μm.

The present embodiments are not limited to the description of the embodiments above, but may be altered in various ways by a skilled person within the scope of the claims. Any embodiment based on a proper combination of technical means disclosed in different embodiments is also encompassed in the technical scope of the present embodiments.

The technology presented herein is applicable as an image sensing lens and an image sensing module each to be mounted in, for example, a digital camera of a portable terminal.

REFERENCE SIGNS LIST 1, 100, 200, 300, 400 image sensing lens
2 aperture stop
3 object
L1 first lens
L2 second lens
L3 third lens
L4 fourth lens
S1 surface of the first lens which surface faces an object side
S2 surface of the first lens which surface faces an image surface side
S3 surface of the second lens which surface faces the object side
S4 surface of the second lens which surface faces the image surface side
S5 surface of the third lens which surface faces the object side
S6 surface of the third lens which surface faces the image surface side
S7 surface of the fourth lens which surface faces the object side
S8 surface of the fourth lens which surface faces the image surface side
S11 image surface
c8 central portion
p8 peripheral portion

The invention claimed is:

1. An image sensing lens comprising, in an order below along a direction from an object to an image surface:
an aperture stop;
a first lens having a positive refracting power;
a second lens having a negative refracting power;
a third lens having a positive refracting power; and a fourth lens having a negative refracting power, the second lens having an image-side surface facing the image surface, the image-side surface being a concave surface, the third lens being a meniscus lens having an image-side surface facing the image surface, the image-side surface being a convex surface, the fourth lens having (i) an object-side surface facing the object, the object-side surface being a concave surface, and (ii) an image-side surface facing the image surface, the image-side surface being concave at a central portion and convex at a peripheral portion around the central portion, the image-side surface of the third lens being an aspheric surface, the object-side surface and the image-side surface of the fourth lens being each an aspheric surface, the image sensing lens satisfying Formulae (1) through (3) below, $$0.51 < f1/f < 0.78 \quad (1)$$

$$-1.63 < f2/f < -0.97 \quad (2)$$

$$v1 - v2 > 20 \quad (3),$$

where f is a focal length of the image sensing lens; f1 is a focal length of the first lens; f2 is a focal length of the second lens; v1 is an Abbe number of the first lens; and v2 is an Abbe number of the second lens, wherein:

the image sensing lens satisfies Formulae (4) and (5) below, $$0.91 < f3/f < 1.89 \quad (4)$$

$$-0.9 < f4/f < -0.49 \quad (5),$$

where f3 is a focal length of the third lens; and f4 is a focal length of the fourth lens.

2. The image sensing lens according to claim 1, wherein:

the first lens having (i) an object-side surface facing the object and (ii) an image-side surface facing the image surface, the object-side surface and the image-side surface being each an aspheric surface;

the image-side surface of the second lens being an aspheric surface; and the third lens having an object-side surface facing the object, the object-side surface being an aspheric surface.

3. The image sensing lens according to claim 1, wherein:

the second lens having an object-side surface facing the object, the object-side surface being an aspheric surface.

4. The image sensing lens according to claim 1, wherein:

each of the first lens, the second lens, the third lens, and the fourth lens is made of plastic.

5. The image sensing lens according to claim 1, wherein:

the image sensing lens has an F number of less than 3.5.

6. An image sensing module comprising:

(i) an image sensing lens including, in an order below along a direction from an object to an image surface:

an aperture stop;

a first lens having a positive refracting power;

a second lens having a negative refracting power;

a third lens having a positive refracting power; and a fourth lens having a negative refracting power, the second lens having an image-side surface facing the image surface, the image-side surface being a concave surface, the third lens being a meniscus lens having an image-side surface facing the image surface, the image-side surface being a convex surface, the fourth lens having (i) an object-side surface facing the object, the object-side surface being a concave surface, and (ii) an image-side surface facing the image surface, the image-side surface being concave at a central portion and convex at a peripheral portion around the central portion, the image-side surface of the third lens being an aspheric surface, the object-side surface and the image-side surface of the fourth lens being each an aspheric surface, the image sensing lens satisfying Formulae (1) through (3) below, $$0.51 < f1/f < 0.78 \quad (1)$$

$$-1.63 < f2/f < -0.97 \quad (2)$$

$$v1 - v2 > 20 \quad (3),$$

where f is a focal length of the image sensing lens; f1 is a focal length of the first lens; f2 is a focal length of the second lens; v1 is an Abbe number of the first lens; and v2 is an Abbe number of the second lens; and (ii) a solid-state image sensing device for receiving, as a light signal, light of an image formed by the image sensing lens, wherein:

the image sensing lens satisfies Formulae (4) and (5) below, $$0.91 < f3/f < 1.89 \quad (4)$$

$$-0.9 < f4/f < -0.49 \quad (5),$$

where f3 is a focal length of the third lens; and f4 is a focal length of the fourth lens.

7. The image sensing module according to claim 6, wherein:

the solid-state image sensing device has a number of pixels which number is not smaller than 3 megapixels.

8. The image sensing module according to claim 6, wherein:

the solid-state image sensing device has a pixel size which is smaller than 2.5 μm.

* * * * *